(12) United States Patent
Lemons

(10) Patent No.: US 7,919,702 B2
(45) Date of Patent: Apr. 5, 2011

(54) APPARATUS AND METHOD OF DISPLAYING INFINITELY SMALL DIVISIONS OF MEASUREMENT

(75) Inventor: Kenneth R. Lemons, Indianapolis, IN (US)

(73) Assignee: Master Key, LLC, Indianapolis, IN (US)

( * ) Notice: Subject to any disclaimer, the term of this patent is extended or adjusted under 35 U.S.C. 154(b) by 201 days.

(21) Appl. No.: 12/322,483

(22) Filed: Feb. 2, 2009

(65) Prior Publication Data
US 2009/0223349 A1    Sep. 10, 2009

Related U.S. Application Data

(60) Provisional application No. 61/025,542, filed on Feb. 1, 2008.

(51) Int. Cl.
*G10H 1/00* (2006.01)
*G09B 15/00* (2006.01)
*G09B 15/02* (2006.01)

(52) U.S. Cl. .................... 84/477 R; 84/471 R; 84/483.2

(58) Field of Classification Search .................. None
See application file for complete search history.

(56) References Cited

U.S. PATENT DOCUMENTS

| | | |
|---|---|---|
| 2,804,500 A | 8/1957 | Giacoletto |
| 3,969,972 A | 7/1976 | Bryant |
| 4,128,846 A | 12/1978 | Robinson, Jr. |
| 4,172,406 A | 10/1979 | Martinez |
| 4,257,062 A | 3/1981 | Meredith |
| 4,378,466 A | 3/1983 | Esser |
| 4,526,168 A | 7/1985 | Hassler et al. |
| 4,887,507 A | 12/1989 | Shaw |
| 4,907,573 A | 3/1990 | Nagasaki |
| 5,048,390 A | 9/1991 | Adachi et al. |
| 5,207,214 A | 5/1993 | Romano |
| 5,370,539 A | 12/1994 | Dillard |
| 5,415,071 A | 5/1995 | Davies |
| 5,563,358 A | 10/1996 | Zimmerman |

(Continued)

FOREIGN PATENT DOCUMENTS

EP    0349686 A1    1/1990

(Continued)

OTHER PUBLICATIONS

"Time-line of the Music Animation Machine (and related experiments)", Music Animation Machine: History, htp://www.musanim.com/mam/mamhist.htm, pp. 1-5, p. 1, pp. 1-2, pp. 1-2 & p. 1, printed Aug. 30, 2007.

(Continued)

*Primary Examiner* — Marlon T Fletcher
(74) *Attorney, Agent, or Firm* — Woodard, Emhardt, Moriarty, McNett & Henry LLP

(57) ABSTRACT

The present disclosure relates to a system and method for visualization of precise levels of measurement. In one embodiment, labels are placed around the perimeter of a circle. The difference between a target quantity and a measured quantity is visualized by displaying a line between two of the labels. In some embodiments, the lines representing the intervals are color coded with a different color for each of a chosen set of intervals. In other embodiments, a series of concentric circles are used, with the color within each circle indicating a level of measurement within a given range of measurement.

9 Claims, 23 Drawing Sheets
(19 of 23 Drawing Sheet(s) Filed in Color)

U.S. PATENT DOCUMENTS

| | | | |
|---|---|---|---|
| 5,741,990 A | 4/1998 | Davies | |
| 5,784,096 A | 7/1998 | Paist | |
| 6,031,172 A | 2/2000 | Papadopoulos | |
| 6,111,755 A | 8/2000 | Park | |
| 6,127,616 A | 10/2000 | Yu | |
| 6,137,041 A | 10/2000 | Nakano | |
| 6,201,769 B1 | 3/2001 | Lewis | |
| 6,245,981 B1 | 6/2001 | Smith | |
| 6,350,942 B1 | 2/2002 | Thomson | |
| 6,390,923 B1 | 5/2002 | Yoshitomi et al. | |
| 6,392,131 B2 | 5/2002 | Boyer | |
| 6,411,289 B1 | 6/2002 | Zimmerman | |
| 6,448,487 B1 | 9/2002 | Smith | |
| 6,544,123 B1* | 4/2003 | Tanaka et al. | 463/36 |
| 6,686,529 B2 | 2/2004 | Kim | |
| 6,750,386 B2 | 6/2004 | King | |
| 6,791,568 B2 | 9/2004 | Steinberg et al. | |
| 6,841,724 B2 | 1/2005 | George | |
| 6,856,329 B1 | 2/2005 | Peevers et al. | |
| 6,927,331 B2 | 8/2005 | Haase | |
| 6,930,235 B2 | 8/2005 | Sandborn et al. | |
| 7,030,307 B2 | 4/2006 | Wedel | |
| 7,096,154 B1 | 8/2006 | Andrade-Cetto | |
| 7,153,139 B2 | 12/2006 | Wen et al. | |
| 7,182,601 B2 | 2/2007 | Donnan | |
| 7,212,213 B2 | 5/2007 | Steinberg et al. | |
| 7,271,328 B2* | 9/2007 | Pangrle | 84/464 R |
| 7,271,329 B2 | 9/2007 | Franzblau | |
| 7,400,361 B2 | 7/2008 | Noske et al. | |
| 7,521,619 B2* | 4/2009 | Salter | 84/477 R |
| 2003/0205124 A1 | 11/2003 | Foote et al. | |
| 2004/0089132 A1* | 5/2004 | Georges et al. | 84/609 |
| 2004/0206225 A1 | 10/2004 | Wedel | |
| 2005/0190199 A1 | 9/2005 | Brown et al. | |
| 2005/0241465 A1 | 11/2005 | Goto | |
| 2007/0044639 A1 | 3/2007 | Farbood et al. | |
| 2007/0157795 A1 | 7/2007 | Hung | |
| 2007/0180979 A1 | 8/2007 | Rosenberg | |
| 2008/0022842 A1 | 1/2008 | Lemons | |
| 2008/0264239 A1* | 10/2008 | Lemons et al. | 84/477 R |
| 2008/0271589 A1* | 11/2008 | Lemons | 84/477 R |
| 2008/0271590 A1* | 11/2008 | Lemons | 84/483.2 |
| 2008/0271591 A1* | 11/2008 | Lemons | 84/601 |
| 2008/0276790 A1* | 11/2008 | Lemons | 84/477 R |
| 2008/0276791 A1* | 11/2008 | Lemons | 84/483.2 |
| 2008/0314228 A1 | 12/2008 | Dreyfuss et al. | |

FOREIGN PATENT DOCUMENTS

| | | |
|---|---|---|
| EP | 456 860 A1 | 11/1991 |
| EP | 1354561 A1 | 10/2003 |
| JP | 05-232856 | 9/1993 |
| JP | 2004-226556 A | 8/2004 |
| KR | 10-2005-0083806 A | 8/2005 |
| KR | 10-2006-0110988 | 10/2006 |

OTHER PUBLICATIONS

Ashton, Anthony, "Harmonograph: A Visual Guide to the Mathematics of Music," ISBN 0-8027-1409-9, Walker Publishing Company, 2003, pp. 1-58.

Bourke, Paul, "Harmonograph," Aug. 1999, http://local.wasp.uwa.edu.au/~pbourke/suraces_curves/harmonograph/, pp. 1-6, printed Aug. 30, 2007.

Dunne, Gabriel, "Color/Shape/Shound Ratio & Symmetry Calculator", Quilime.com—Symmetry Calculator, https://www.quilime.com/conent/colorcalc/, pp. 1-6, printed Jul. 3, 2007.

Notification of Transmittal International Preliminary Report on Patentability for International Application No. PCT/US07/15822, dated Oct. 23, 2008.

Patent Application Search Report mailed on Aug. 1, 2008 for PCT/US2008/59126.

Patent Application Search Report mailed on Aug. 14, 2008 for PCT/US2008/004989.

Patent Application Search Report mailed on Aug. 18, 2008 for PCT/US2008/005069.

Patent Application Search Report mailed on Aug. 18, 2008 for PCT/US2008/005073.

Patent Application Search Report mailed on Aug. 18, 2008 for PCT/US2008/005126.

Patent Application Search Report mailed on Aug. 21, 2008 for PCT/US2008/005076.

Patent Application Search Report mailed on Aug. 27, 2008 for PCT/US2008/5075.

Patent Application Search Report mailed on Aug. 28, 2008 for PCT/US2008/005077.

Patent Application Search Report mailed on Jul. 31, 2008 for PCT/US2008/005070.

Patent Application Search Report mailed on Sep. 18, 2008 for PCT/US2008/005072.

Patent Application Search Report mailed on Sep. 18, 2008 for PCT/US2008/005124.

Patent Application Search Report mailed on Sep. 24, 2008 for PCT/US2008/005125.

Patent Application search Report mailed on Sep. 29, 2008 for PCT/US2008/005074.

Rabiner, Huang, "Fundamentals of Speech Recognition," PTR Prentice Hall, Inc., 1993, ISBN 0-13-285826-6, pp. 21-31; 42-68 and Fig. 2.17, 2.32.

Patent Application Search Report mailed on Aug. 25, 2009 for PCT/US2009/000684.

Written Opinion mailed on Aug. 25, 2009 for PCT/US2009/00684.

* cited by examiner

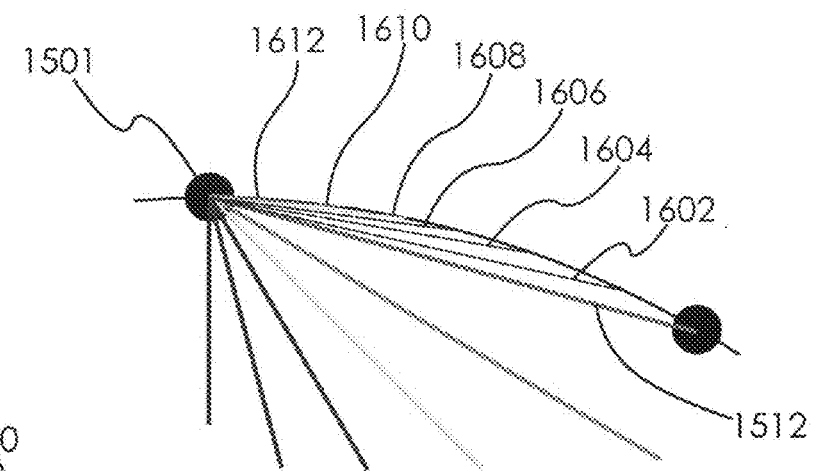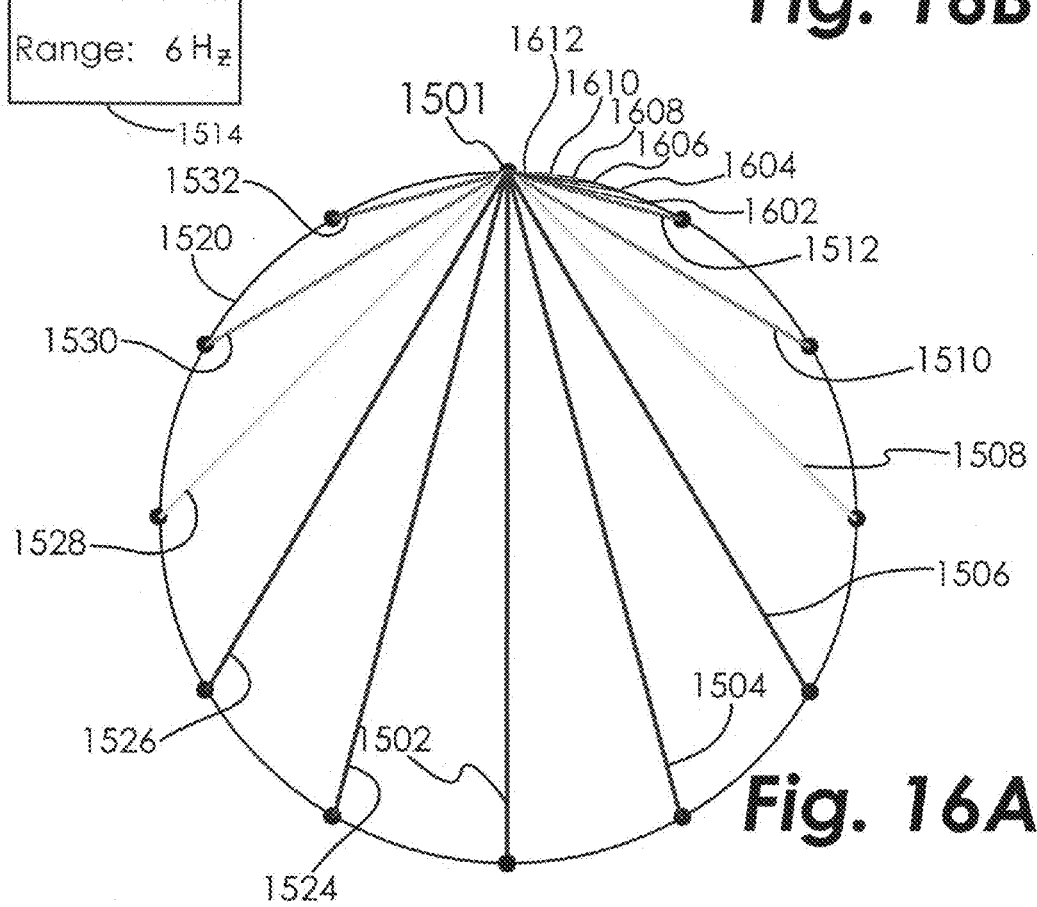

US 7,919,702 B2

APPARATUS AND METHOD OF DISPLAYING INFINITELY SMALL DIVISIONS OF MEASUREMENT

CROSS-REFERENCE TO RELATED APPLICATIONS

The present application claims the benefit of U.S. Provisional Patent Application Ser. No. 61/025,542, filed Feb. 1, 2008, entitled "Apparatus and Method of Displaying Infinitely Small Divisions of Measurement" which is hereby incorporated by reference in its entirety.

The present application is also related to U.S. Provisional Patent Application Ser. No. 60/830,386 filed Jul. 12, 2006 entitled "Apparatus and Method for Visualizing Musical Notation" and U.S. Provisional Patent Application Ser. No. 60/921,578 filed Apr. 3, 2007 entitled "Device and Method for Visualizing Musical Rhythmic Structures". This application is also related to U.S. Utility patent application Ser. No. 11/827,264 filed Jul. 11, 2007 entitled "Apparatus and Method for Visualizing Music and Other Sounds" and U.S. Utility patent application Ser. No. 12/023,375 entitled "Device and Method for Visualizing Musical Rhythmic Structures" filed Jan. 31, 2008. All of these applications are hereby incorporated by reference in their entirety.

TECHNICAL FIELD OF THE DISCLOSURE

The present disclosure generally relates to systems and methods for displaying precise levels of measurement.

BACKGROUND AND SUMMARY

There is a need for a method of displaying extremely small units of measurement.

The present application meets this need.

SUMMARY OF THE DISCLOSURE

Accordingly, in one aspect, a method for displaying a received measurement value is disclosed, comprising the steps of: (a) providing a plurality of labels in a pattern of a circular arc, wherein: (1) the plurality of labels corresponds to a plurality of respective measurement values; and (2) moving clockwise or counter-clockwise on the arc between any one of said labels represents a first measurement increment; (b) identifying a target measurement value; (c) identifying which one of the plurality of respective measurement values corresponds to the target measurement value; (d) identifying an occurrence of a received measurement value; (e) identifying which one of the plurality of respective measurement values corresponds to the received measurement value; (f) identifying a first label corresponding to the target measurement value; (g) identifying a second label corresponding to the received measurement value; (h) creating a first line connecting the first label and the second label, wherein: (1) the first line is a first color if the target measurement value and the received measurement value are separated by the first measurement increment; (2) the first line is a second color if the target measurement value and the received measurement value are separated by a first multiple of the first measurement increment; (3) the first line is a third color if the target measurement value and the received measurement value are separated by a second multiple of the first measurement increment; (4) the first line is a fourth color if the target measurement value and the received measurement value are separated by a third multiple of the first measurement increment; (5) the first line is a fifth color if the target measurement value and the received measurement value are separated by a fourth multiple of the first measurement increment; and (6) the first line is a sixth color if the target measurement value and the received measurement value are separated by a sixth multiple of the first measurement increment.

In another aspect, a method for displaying a received measurement value is disclosed, comprising the steps of: (a) providing a plurality of labels in a pattern of a first circle, wherein: (1) the plurality of labels corresponds to a plurality of respective measurement values; and (2) moving clockwise or counter-clockwise on the first circle between any one of said labels represents a first measurement increment; (b) identifying a target measurement value; (c) identifying which one of the plurality of respective measurement values corresponds to the target measurement value; (d) identifying an occurrence of a received measurement value; (e) identifying which one of the plurality of respective measurement values corresponds to the received measurement value; (f) identifying a first label corresponding to the target measurement value; (g) identifying a second label corresponding to the received measurement value; (h) creating a first line connecting the first label and the second label, wherein: (1) the first line is a first color if the target measurement value and the received measurement value are separated by the first measurement increment; (2) the first line is a second color if the target measurement value and the received measurement value are separated by substantially a first multiple of the first measurement increment; (3) the first line is a third color if the target measurement value and the received measurement value are separated by substantially a second multiple of the first measurement increment; (4) the first line is a fourth color if the target measurement value and the received measurement value are separated by substantially a third multiple of the first measurement increment; (5) the first line is a fifth color if the target measurement value and the received measurement value are separated by substantially a fourth multiple of the first measurement increment; (6) the first line is a sixth color if the target measurement value and the received measurement value are separated by substantially a sixth multiple of the first measurement increment; (i) providing a second circle around the second label, said second circle having a diameter substantially smaller than the diameter of said first circle, wherein: (1) the area within the second circle is the first color if the target measurement and the received measurement are separated by a second increment, said second increment being smaller than said first increment; (2) the area within the second circle is the second color if the target measurement and the received measurement are separated by a first multiple of the second increment; (3) the area within the second circle is the third color if the target measurement and the received measurement are separated by a second multiple of the second increment; (4) the area within the second circle is the fourth color if the target measurement and the received measurement are separated by a third multiple of the second increment; (5) the area within the second circle is the fifth color if the target measurement and the received measurement are separated by a fourth multiple of the second increment; and (6) the area within the second circle is the sixth color if the target measurement and the received measurement are separated by a fifth multiple of the second increment.

According to another aspect, a method for displaying a received measurement value is disclosed, which includes the steps of: (a) providing a plurality of labels in a pattern of a helix, wherein: (1) each turn of the helix has a plurality of labels corresponding to a plurality of respective measurement values in a respective plurality of measurement ranges; and (2) moving clockwise or counter-clockwise on the helix between any one of said labels represents a first measurement increment; (b) identifying a target measurement value; (c) identifying which one of the plurality of respective measurement values and which one of the plurality of respective measurement ranges corresponds to the target measurement value; (d) identifying an occurrence of a received measurement value; (e) identifying which one of the plurality of respective measurement values and which one of the respective plurality of measurement ranges corresponds to the received measurement value; (f) identifying a first label corresponding to the target measurement value; (g) identifying a second label corresponding to the received measurement value; (h) creating a first line connecting the first label and the second label, wherein: (1) the first line is a first color if the target measurement value and the received measurement value are separated by the first measurement increment; (2) the first line is a second color if the target measurement value and the received measurement value are separated by substantially a first multiple of the first measurement increment; (3) the first line is a third color if the target measurement value and the received measurement value are separated by substantially a second multiple of the first measurement increment; (4) the first line is a fourth color if the target measurement value and the received measurement value are separated by substantially a third multiple of the first measurement increment; (5) the first line is a fifth color if the target measurement value and the received measurement value are separated by substantially a fourth multiple of the first measurement increment; and (6) the first line is a sixth color if the target measurement value and the received measurement value are separated by substantially a sixth multiple of the first measurement increment.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 16A is a diagram showing two ranges of measurement with each range having six subdivisions of measurement according to one embodiment.

FIG. 16B is a diagram showing an enlarged view of the portion of FIG. 16A displaying the more precise range of two ranges of measurement.

DETAILED DESCRIPTION OF THE VARIOUS EMBODIMENTS

Before describing the method of displaying infinitely small divisions of measurement, a summary of the above-referenced music tonal and rhythmic visualization methods will be presented. The tonal visualization methods are described in U.S. patent application Ser. No. 11/827,264 filed Jul. 11, 2007 entitled "Apparatus and Method for Visualizing Music and Other Sounds" which is hereby incorporated by reference in its entirety.

There are three traditional scales or 'patterns' of musical tone that have developed over the centuries. These three scales, each made up of seven notes, have become the foundation for virtually all musical education in the modern world. There are, of course, other scales, and it is possible to create any arbitrary pattern of notes that one may desire; but the vast majority of musical sound can still be traced back to these three primary scales.

Each of the three main scales is a lopsided conglomeration of seven intervals:

Major scale: 2 steps, 2 steps, 1 step, 2 steps, 2 steps, 2 steps, 1 step
Harmonic Minor Scale: 2, 1, 2, 2, 1, 3, 1
Melodic Minor Scale: 2, 1, 2, 2, 2, 2, 1

Unfortunately, our traditional musical notation system has also been based upon the use of seven letters (or note names) to correspond with the seven notes of the scale: A, B, C, D, E, F and G. The problem is that, depending on which of the three scales one is using, there are actually twelve possible tones to choose from in the 'pool' of notes used by the three scales.

Because of this discrepancy, the traditional system of musical notation has been inherently lopsided at its root.

With a circle of twelve tones and only seven note names, there are (of course) five missing note names. To compensate, the traditional system of music notation uses a somewhat arbitrary system of 'sharps' (#'s) and 'flats' (b's) to cover the remaining five tones so that a single notation system can be used to encompass all three scales. For example, certain key signatures will have seven 'pure letter' tones (like 'A') in addition to sharp or flat tones (like $C^\#$ or $G^b$), depending on the key signature. This leads to a complex system of reading and writing notes on a staff, where one has to mentally juggle a key signature with various accidentals (sharps and flats) that are then added one note at a time. The result is that the seven-note scale, which is a lopsided entity, is presented as a straight line on the traditional musical notation staff. On the other hand, truly symmetrical patterns (such as the chromatic scale) are represented in a lopsided manner on the traditional musical staff. All of this inefficiency stems from the inherent flaw of the traditional written system being based upon the seven note scales instead of the twelve-tone circle.

Figure 1:
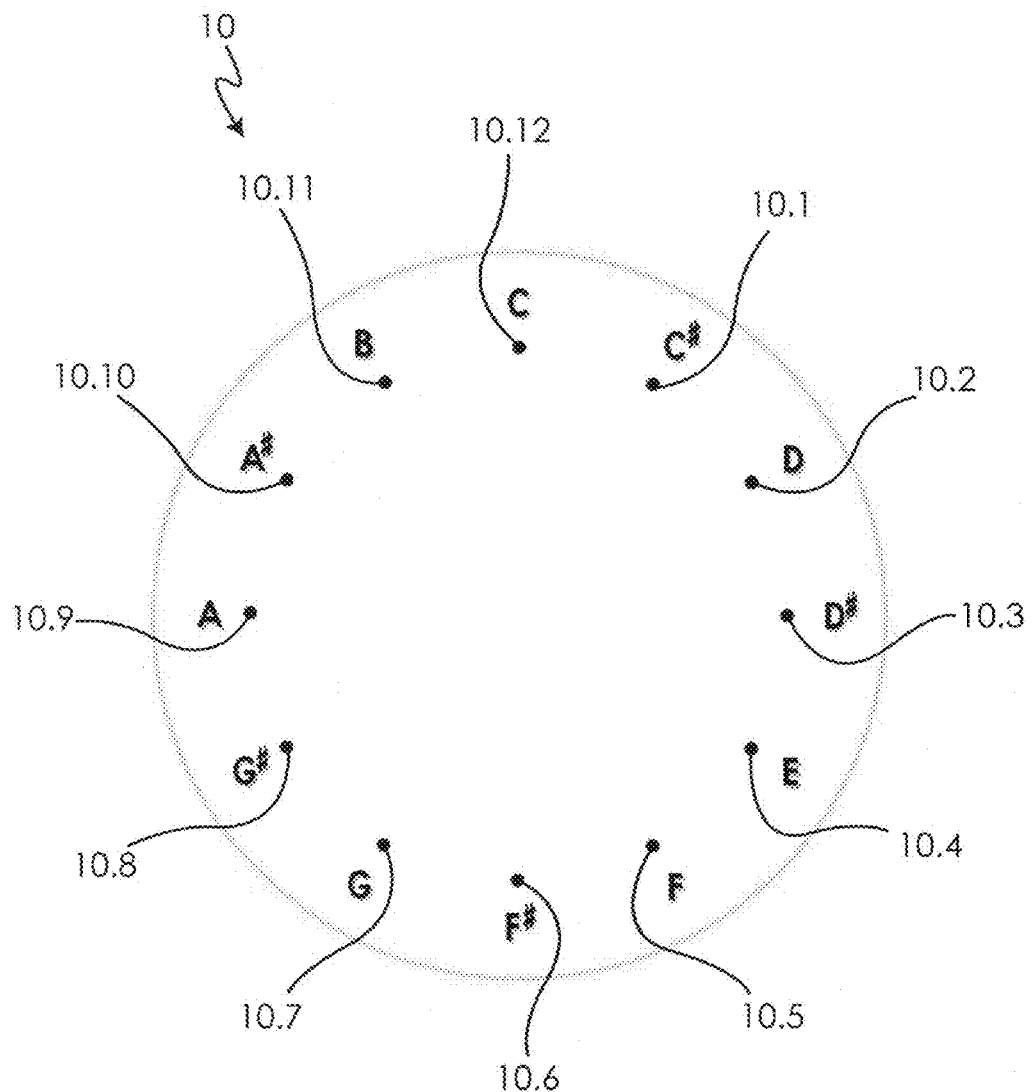
FIG. 1 is a diagram of a twelve-tone circle according to one embodiment.

To overcome this inefficiency, a set of mathematically based, color-coded MASTER KEY™ diagrams is presented to better explain the theory and structures of music using geometric form and the color spectrum. As shown in FIG. 1, the twelve tone circle 10 is the template upon which all of the other diagrams are built. Twelve points 10.1-10.12 are geometrically placed in equal intervals around the perimeter of the circle 10 in the manner of a clock; twelve points, each thirty degrees apart. Each of the points 10.1-10.12 on the circle 10 represents one of the twelve pitches. The names of the various pitches can then be plotted around the circle 10. It will be appreciated that in traditional musical notation there are more than one name for each pitch (e.g., $A^\#$ is the same as $B^b$), which causes inefficiency and confusion since each note can be 'spelled' in two different ways. In the illustrated embodiment, the circle 10 has retained these traditional labels, although the present disclosure comprehends that alternative labels can be used, such as the letters A-L, or numbers 1-12. Furthermore, the circle 10 of FIG. 1 uses the sharp notes as labels; however, it will be understood that some or all of these sharp notes can be labeled with their flat equivalents and that some of the non-sharp and non-flat notes can be labeled with the sharp or flat equivalents.

Figure 2:
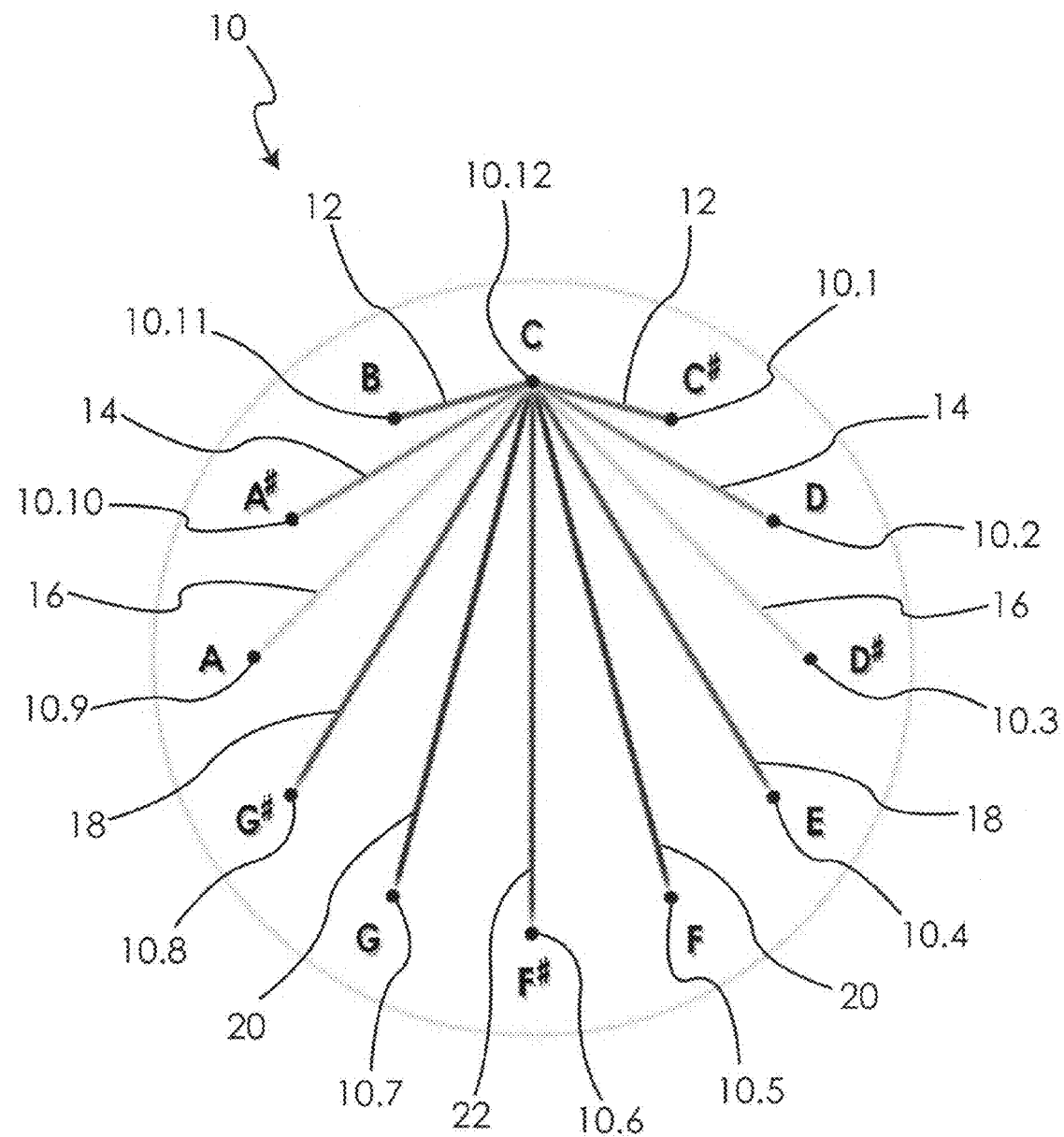
FIG. 2 is a diagram of a twelve-tone circle showing the six intervals.

The next 'generation' of the MASTER KEY™ diagrams involves thinking in terms of two note 'intervals.' The Interval diagram, shown in FIG. 2, is the second of the MASTER KEY™ diagrams, and is formed by connecting the top point 10.12 of the twelve-tone circle 10 to every other point 10.1-10.11. The ensuing lines-their relative length and color-represent the various 'intervals.' It shall be understood that while eleven intervals are illustrated in FIG. 2, there are actually only six basic intervals to consider. This is because any interval larger than the tri-tone (displayed in purple in FIG. 2) has a 'mirror' interval on the opposite side of the circle. For example, the whole-step interval between C (point 10.12) and D (point 10.2) is equal to that between C (point 10.12) and A# (point 10.10).

Another important aspect of the MASTER KEY™ diagrams is the use of color. Because there are six basic music intervals, the six basic colors of the rainbow can be used to provide another way to comprehend the basic structures of music. In a preferred embodiment, the interval line 12 for a half step is colored red, the interval line 14 for a whole step is colored orange, the interval line 16 for a minor third is colored yellow, the interval line 18 for a major third is colored green, the interval line 20 for a perfect fourth is colored blue, and the interval line 22 for a tri-tone is colored purple. In other embodiments, different color schemes may be employed. What is desirable is that there is a gradated color spectrum assigned to the intervals so that they may be distinguished from one another by the use of color, which the human eye can detect and process very quickly.

Figure 3:
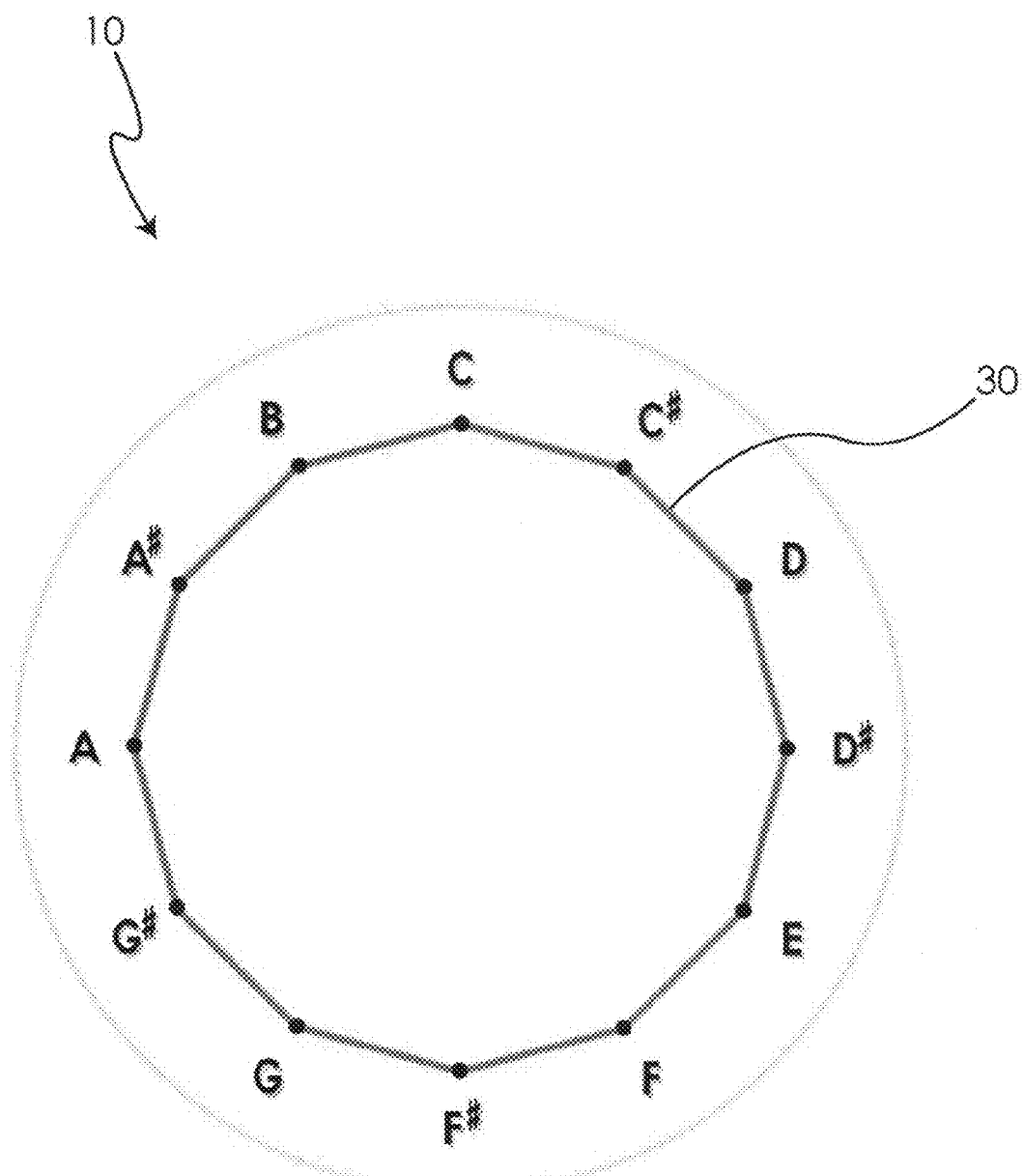
FIG. 3 is a diagram of a twelve-tone circle showing the chromatic scale.
Figure 4:
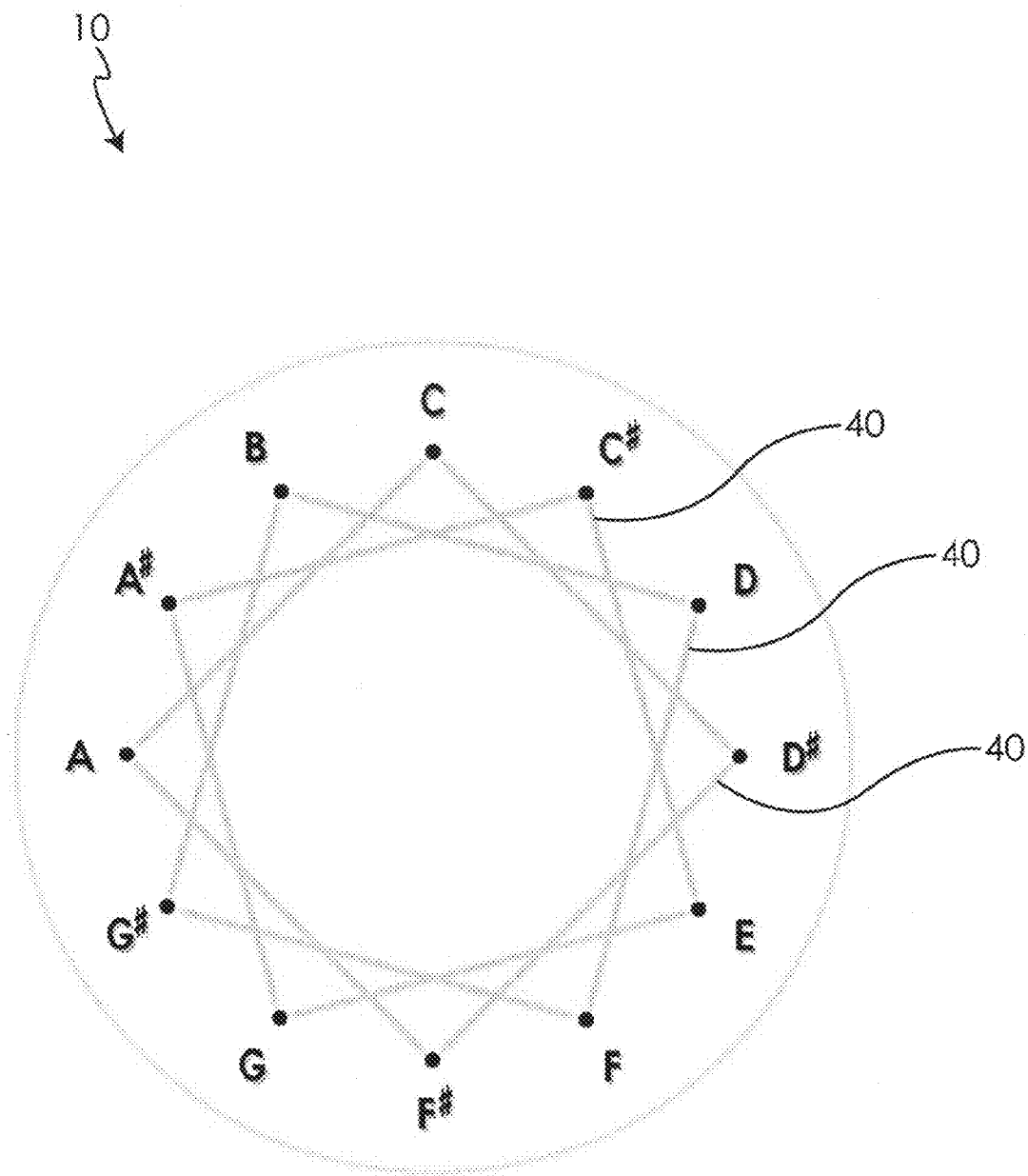
FIG. 4 is a diagram of a twelve-tone circle showing the first through third diminished scales.
Figure 5:
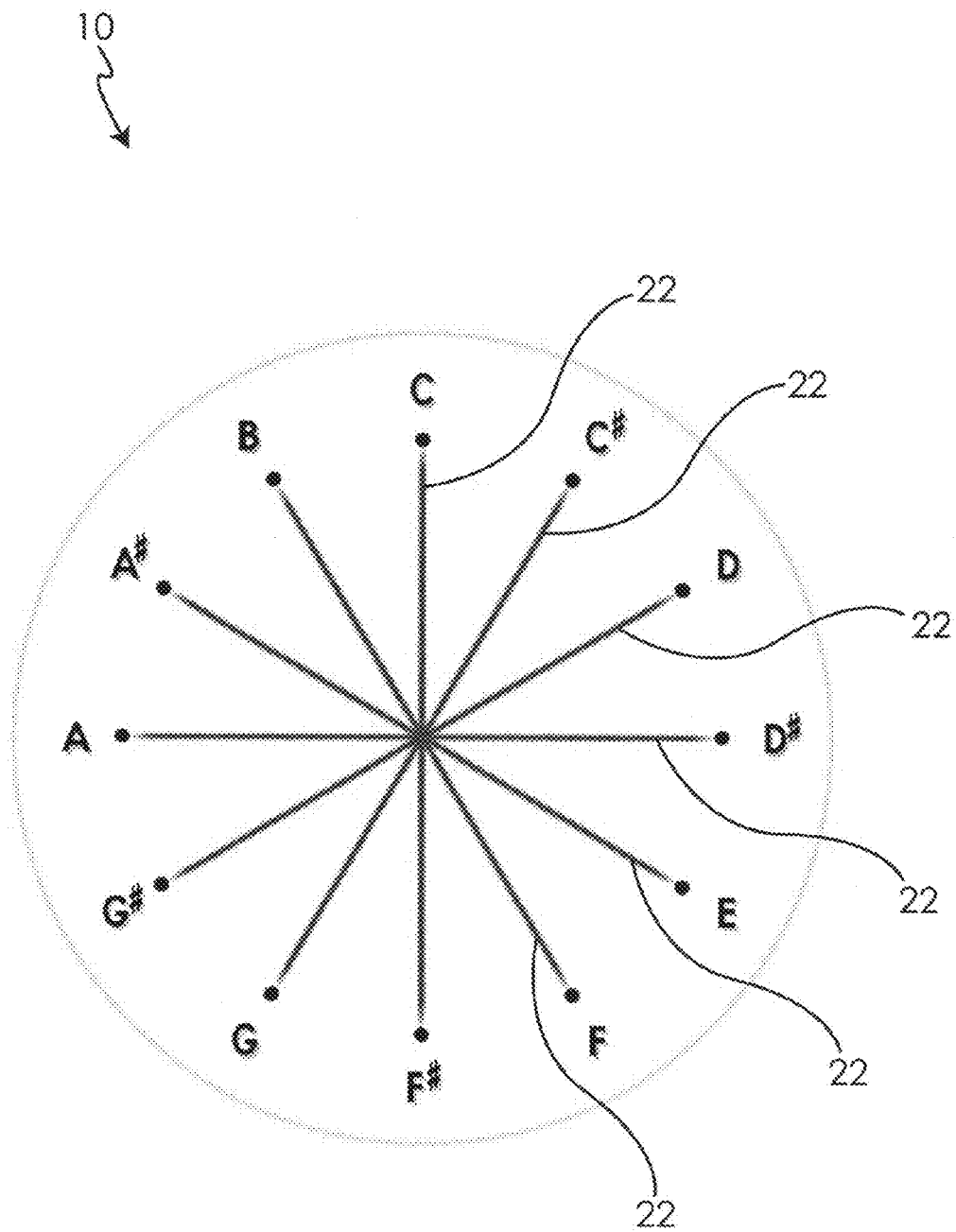
FIG. 5 is a diagram of a twelve-tone circle showing all six tri-tones.

The next group of MASTER KEY™ diagrams pertains to extending the various intervals 12-22 to their completion around the twelve-tone circle 10. This concept is illustrated in FIG. 3, which is the diagram of the chromatic scale. In these diagrams, each interval is the same color since all of the intervals are equal (in this case, a half-step). In the larger intervals, only a subset of the available tones is used to complete one trip around the circle. For example, the minor-third scale, which gives the sound of a diminished scale and forms the shape of a square 40, requires three transposed scales to fill all of the available tones, as illustrated in FIG. 4. The largest interval, the tri-tone, actually remains a two-note shape 22, with six intervals needed to complete the circle, as shown in FIG. 5.

Figure 6:
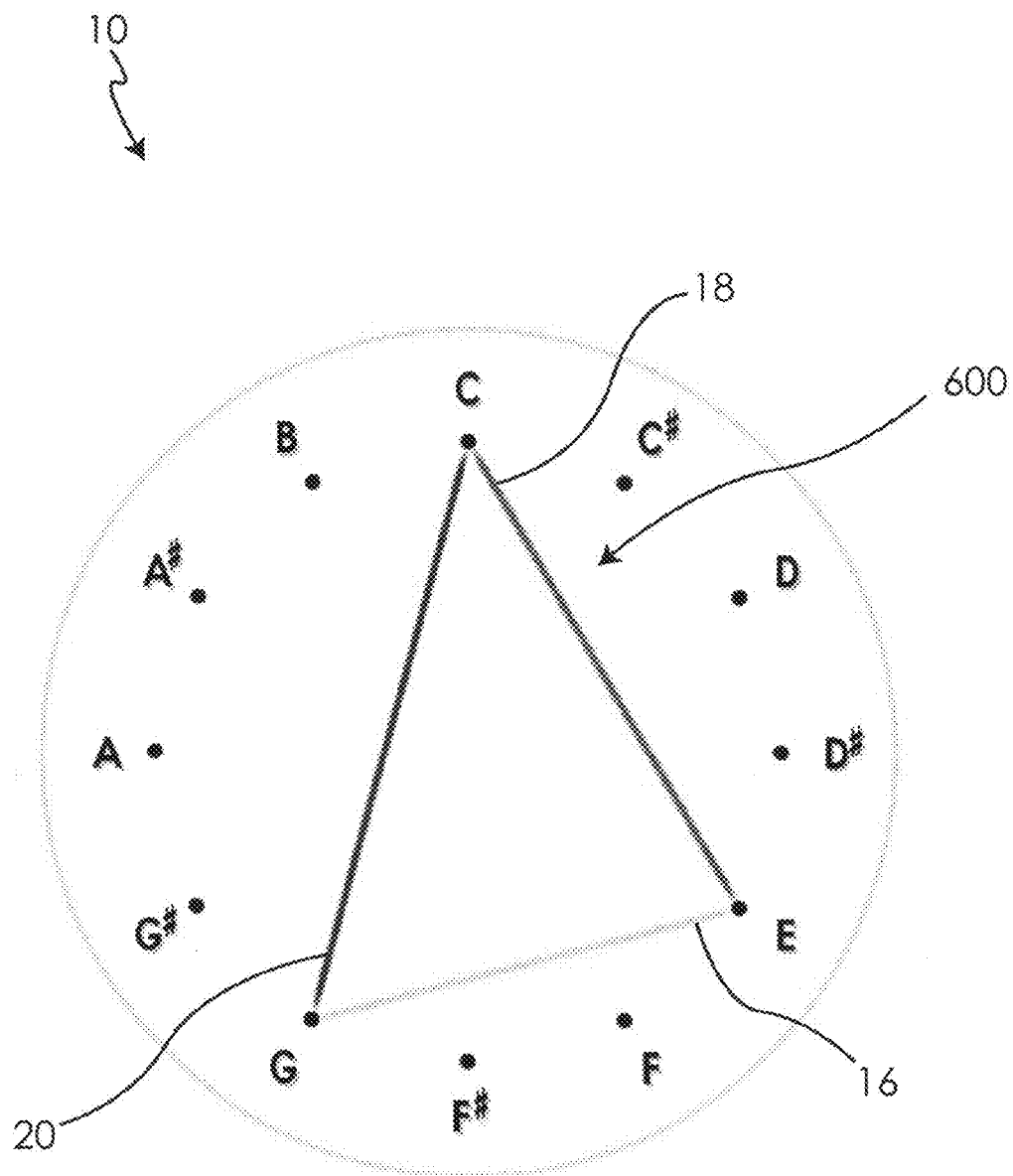
FIG. 6 is a diagram of a twelve-tone circle showing a major triad.

The next generation of MASTER KEY™ diagrams is based upon musical shapes that are built with three notes. In musical terms, three note structures are referred to as triads. There are only four triads in all of diatonic music, and they have the respective names of major, minor, diminished, and augmented. These four, three-note shapes are represented in the MASTER KEY™ diagrams as different sized triangles, each built with various color coded intervals. As shown in FIG. 6, for example, the major triad 600 is built by stacking (in a clockwise direction) a major third 18, a minor third 16, and then a perfect fourth 20. This results in a triangle with three sides in the respective colors of green, yellow, and blue, following the assigned color for each interval in the triad. The diagrams for the remaining triads (minor, diminished, and augmented) follow a similar approach.

Figure 7:
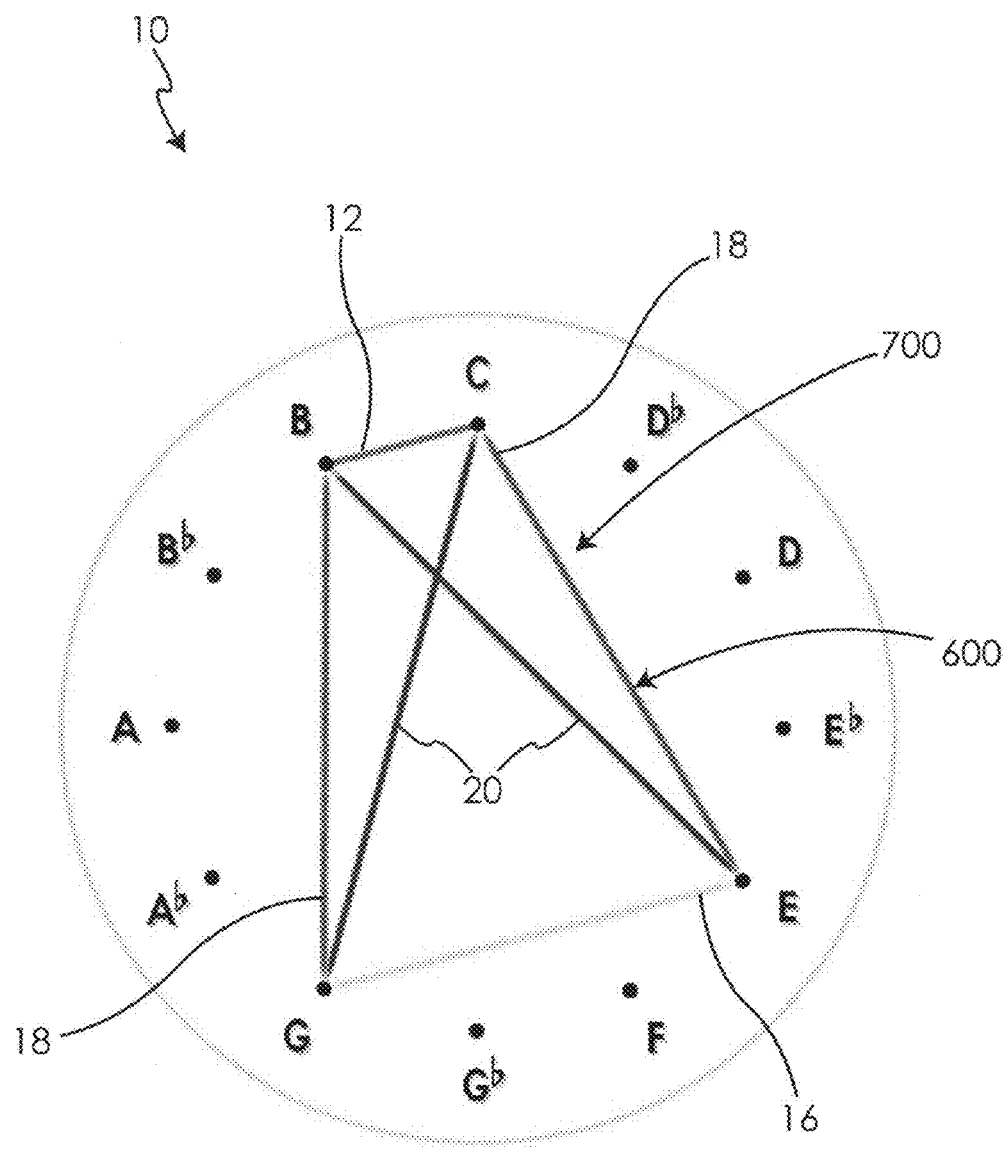
FIG. 7 is a diagram of a twelve-tone circle showing a major seventh chord.

The next group of MASTER KEY™ diagrams are developed from four notes at a time. Four note chords, in music, are referred to as seventh chords, and there are nine types of seventh chords. FIG. 7 shows the diagram of the first seventh chord, the major seventh chord 700, which is created by stacking the following intervals (as always, in a clockwise manner): a major third 18, a minor third 16, another major third 18, and a half step 12. The above description illustrates the outer shell of the major seventh chord 700 (a four-sided polyhedron); however, general observation will quickly reveal a new pair of 'internal' intervals, which haven't been seen in previous diagrams (in this instance, two perfect fourths 20). The eight remaining types of seventh chords can likewise be mapped on the MASTER KEY™ circle using this method.

Figure 8:
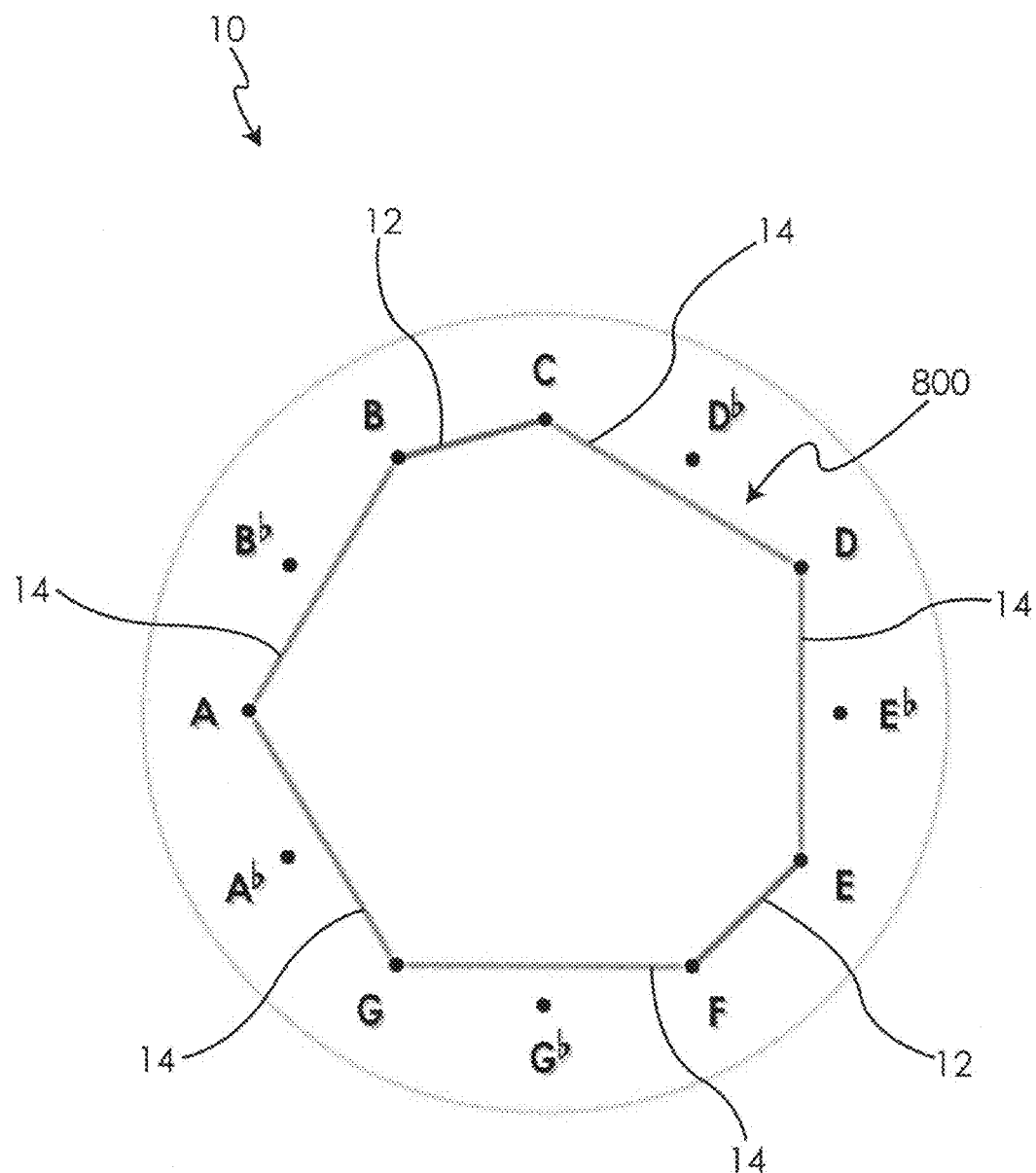
FIG. 8 is a diagram of a twelve-tone circle showing a major scale.

Every musical structure that has been presented thus far in the MASTER KEY™ system, aside from the six basic intervals, has come directly out of three main scales. Again, the three main scales are as follows: the Major Scale, the Harmonic-Minor Scale, and the Melodic-Minor Scale. The major scale is the most common of the three main scales and is heard virtually every time music is played or listened to in the western world. As shown in FIG. 8 and indicated generally at 800, the MASTER KEY™ diagram clearly shows the major scale's 800 makeup and its naturally lopsided nature. Starting at the top of the circle 10, one travels clockwise around the scale's outer shell. The following pattern of intervals is then encountered: whole step 14, whole step 14, half step 12, whole step 14, whole step 14, whole step 14, half step 12. The most important aspect of each scale diagram is, without a doubt, the diagram's outer 'shell.' Therefore, the various internal intervals in the scale's interior are not shown. Since we started at point 10.12, or C, the scale 800 is the C major scale. Other major scales may be created by starting at one of the other notes on the twelve-tone circle 10. This same method can be used to create diagrams for the harmonic minor and melodic minor scales as well.

Figure 9:
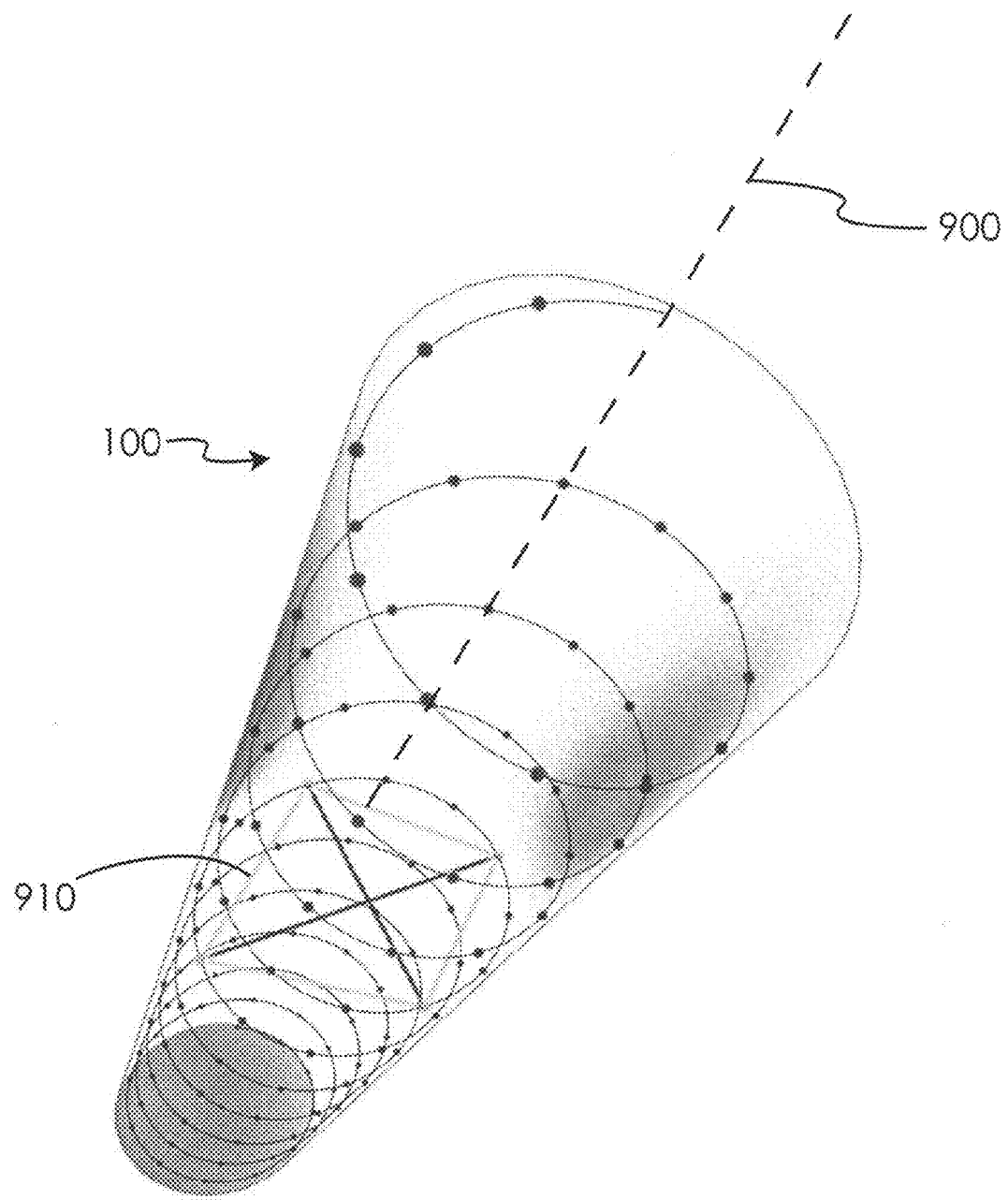
FIGS. 9-10 are diagrams of a helix showing a B diminished seventh chord.
Figure 10:
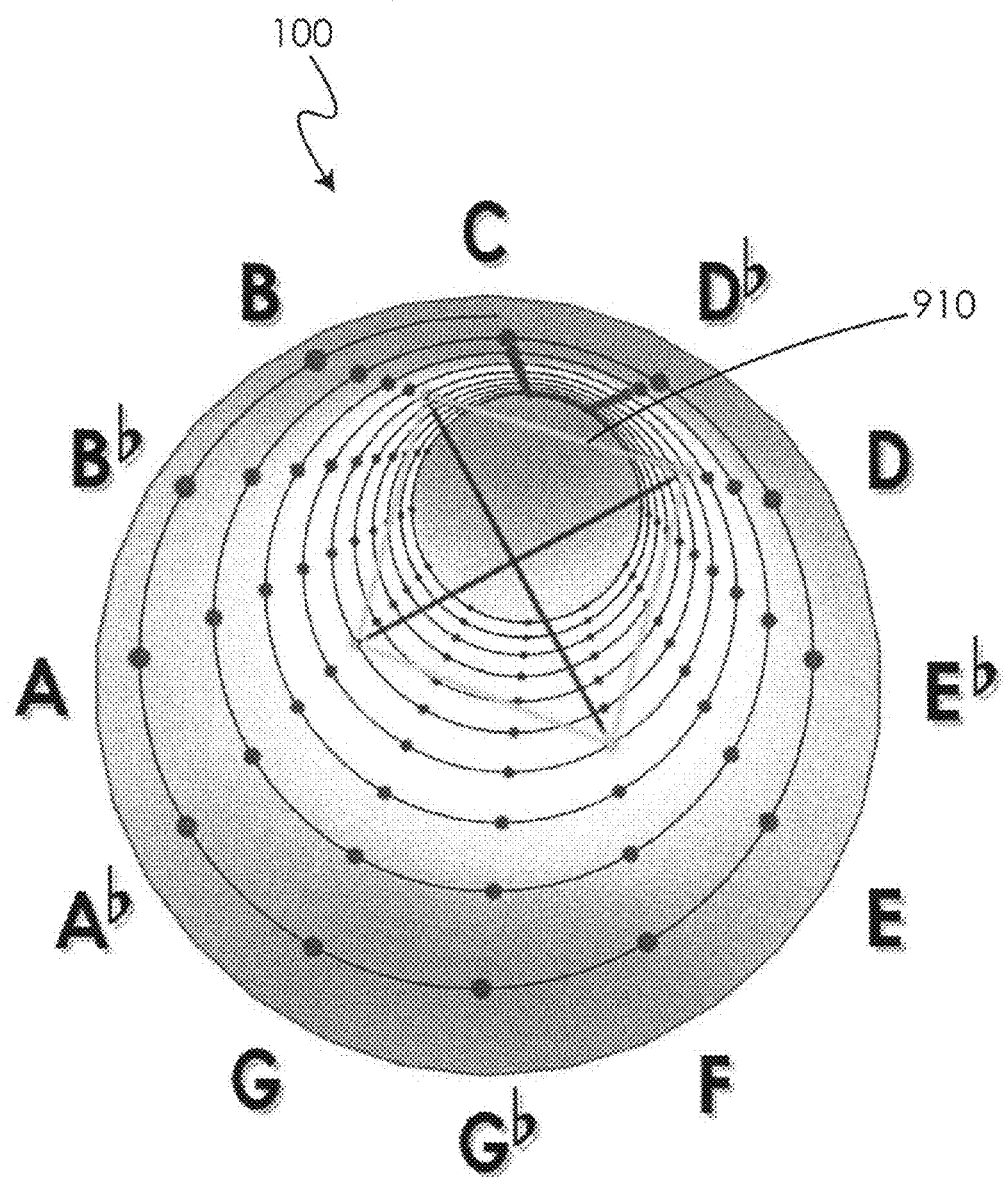

The previously described diagrams have been shown in two dimensions; however, music is not a circle as much as it is a helix. Every twelfth note (an octave) is one helix turn higher or lower than the preceding level. What this means is that music can be viewed not only as a circle but as something that will look very much like a DNA helix, specifically, a helix of approximately ten and one-half turns (i.e. octaves). There are only a small number of helix turns in the complete spectrum of audible sound; from the lowest auditory sound to the highest auditory sound. By using a helix instead of a circle, not only can the relative pitch difference between the notes be discerned, but the absolute pitch of the notes can be seen as well. For example, FIG. 9 shows a helix 100 about an axis 900 in a perspective view with a chord 910 (a fully diminished seventh chord in this case) placed within. In FIG. 10, the perspective has been changed to allow each octave point on consecutive turns of the helix to line up. This makes it possible to use a single set of labels around the helix. The user is then able to see that this is a B fully diminished seventh chord and discern which octave the chord resides in.

Figure 11:
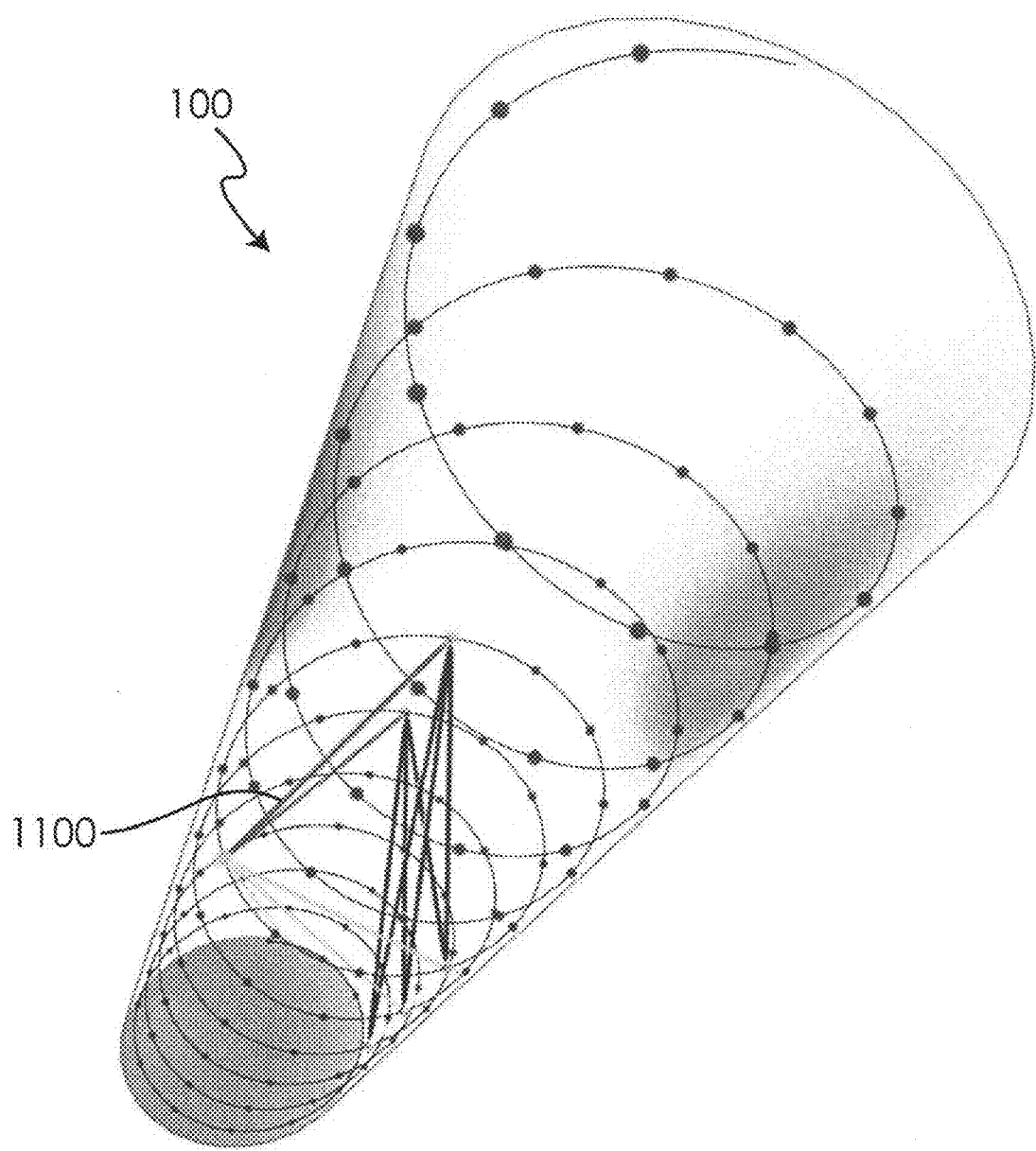
FIG. 11 is a diagram of a helix showing an F minor triad covering three octaves.

The use of the helix becomes even more powerful when a single chord is repeated over multiple octaves. For example, FIG. 11 shows how three F minor triad chords look when played together over three and one-half octaves. In two dimensions, the user will only see one triad, since all three of the triads perfectly overlap on the circle. In the three-dimensional helix, however, the extended scale is visible across all three octaves.

The above described MASTER KEY™ system provides a method for understanding the tonal information within musical compositions. Another method, however, is needed to deal with the rhythmic information, that is, the duration of each of the notes and relative time therebetween. Such rhythmic visualization methods are described in U.S. Utility patent application Ser. No. 12/023,375 entitled "Device and Method for Visualizing Musical Rhythmic Structures" filed Jan. 31, 2008 which is also hereby incorporated by reference in its entirety.

In addition to being flawed in relation to tonal expression, traditional sheet music also has shortcomings with regards to rhythmic information. This becomes especially problematic for percussion instruments that, while tuned to a general frequency range, primarily contribute to the rhythmic structure of music. For example, traditional staff notation 1250, as shown in the upper portion of FIG. 12, uses notes 1254 of basically the same shape (an oval) for all of the drums in a modern drum kit and a single shape 1256 (an 'x' shape) for all of the cymbals. What is needed is a method that more intuitively conveys the character of individual rhythmic instruments and the underlying rhythmic structures present in a given composition.

Figure 12:
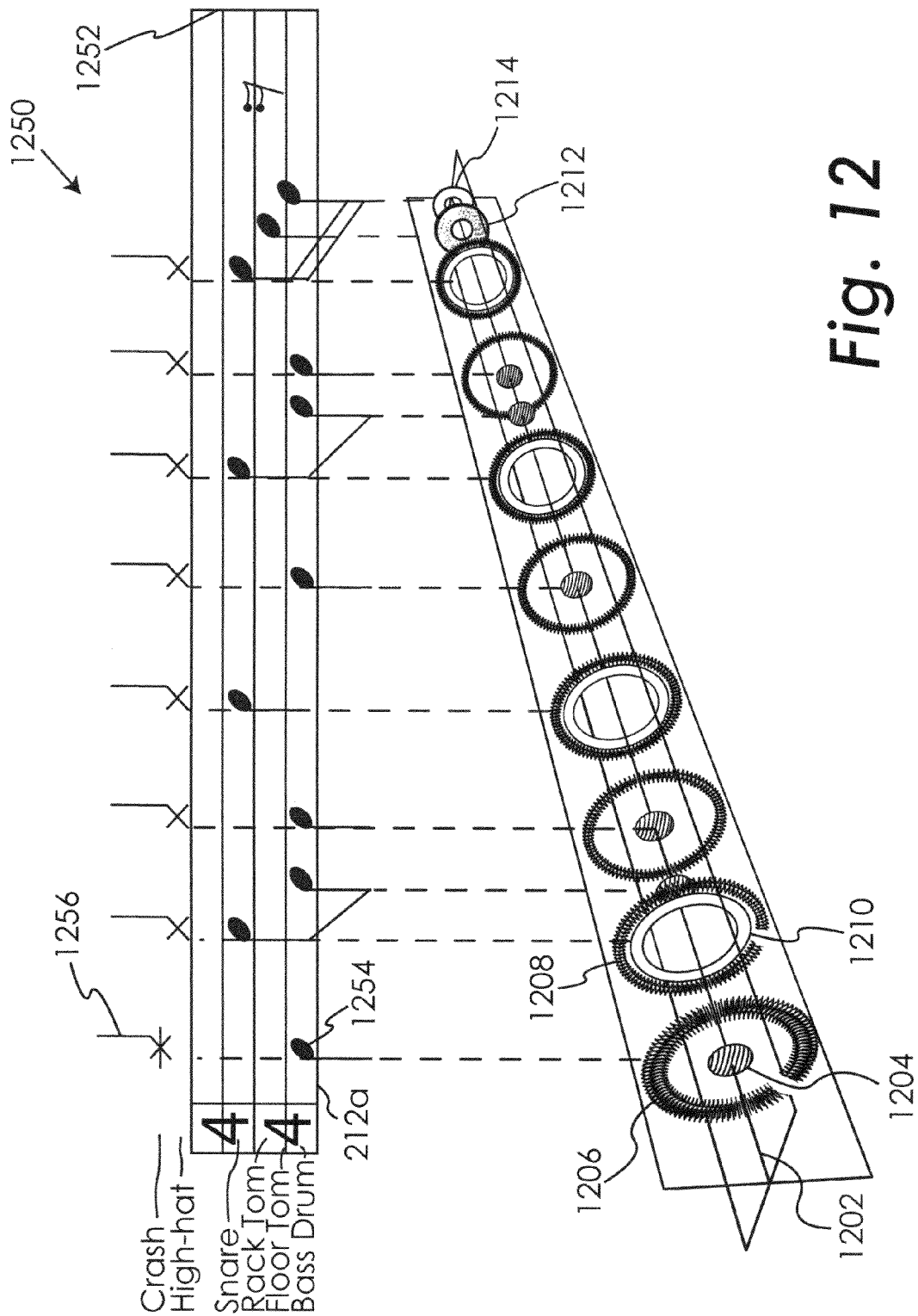
FIG. 12 is a perspective view of the visual representation of percussive music according to one embodiment shown with associated standard notation for the same percussive music.

The lower portion of FIG. 12 shows one embodiment of the disclosed method which utilizes spheroids 1204 and toroids 1206, 1208, 1210, 1212 and 1214 of various shapes and sizes in three dimensions placed along a time line 1202 to represent the various rhythmic components of a particular musical composition. The lowest frequencies or lowest instrument in the composition (i.e. the bass drum) will appear as spheroids 1204. As the rhythmical frequencies get higher in range, toroids 1206, 1208, 1210, 1212 and 1214 of various sizes are used to represent the sounded instrument. While the diameter and thicknesses of these spheroids and toroids may be adjustable components that are customizable by the user, the focus will primarily be on making the visualization as "crisply" precise as possible. In general, therefore, as the relative frequency of the sounded instrument increases, the maximum diameter of the spheroid or toroid used to depict the sounding of the instrument also increases. For example, the bass drum is represented by a small spheroid 1204, the floor tom by toroid 1212, the rack tom by toroid 1214, the snare by toroid 1210, the high-hat cymbal by toroid 1208, and the crash cymbal by toroid 1206. In certain embodiments, spheroids 1204 may be implements as perfect spheres, general spheroids, or as rounded disks. Those skilled in the art will recognize that other geometric shapes may be utilized to represent the sounds of the instruments within the scope of the disclosure.

Figure 13:
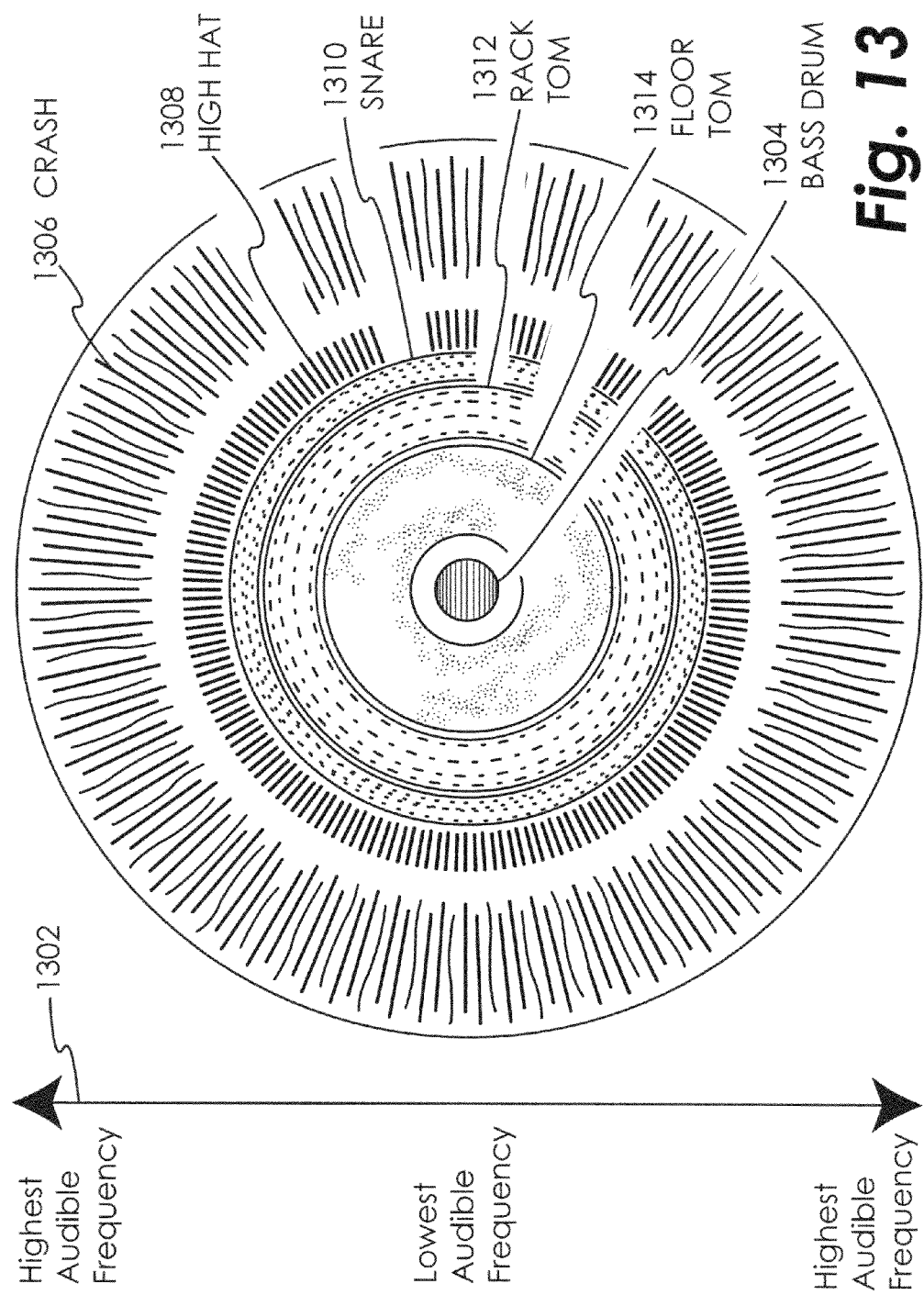
FIG. 13 is a two dimensional view looking along the time line of a visual representation of percussive music at an instant when six percussive instruments are being simultaneously sounded.

FIG. 13 shows another embodiment which utilizes a two-dimensional view looking into the time line 1202. In this embodiment, the spheroids 1204 and toroids 1206, 1208, 1210 and 1212 from FIG. 12 correspond to circles 1304 and rings 1306, 1308, 1310 and 1312, respectively. The lowest frequencies (i.e. the bass drum) will appear as a solid circle 1304 in a hard copy embodiment. Again, as the relative frequency of the sounded instrument increases, the maximum diameter of the circle or ring used to depict the sounding of the instrument also increases, as shown by the scale 1302.

Because cymbals have a higher auditory frequency than drums, cymbal toroids have a resultantly larger diameter than any of the drums. Furthermore, the amorphous sound of a cymbal will, as opposed to the crisp sound of a snare, be visualized as a ring of varying thickness, much like the rings of a planet or a moon. The "splash" of the cymbal can then be animated as a shimmering effect within this toroid. In one embodiment, the shimmering effect can be achieved by randomly varying the thickness of the toroid at different points over the circumference of the toroid during the time period in which the cymbal is being sounded as shown by toroid 1204 and ring 1306 in FIGS. 12 and 13, respectively. It shall be understood by those with skill in the art that other forms of image manipulation may be used to achieve this shimmer effect.

Figure 14:
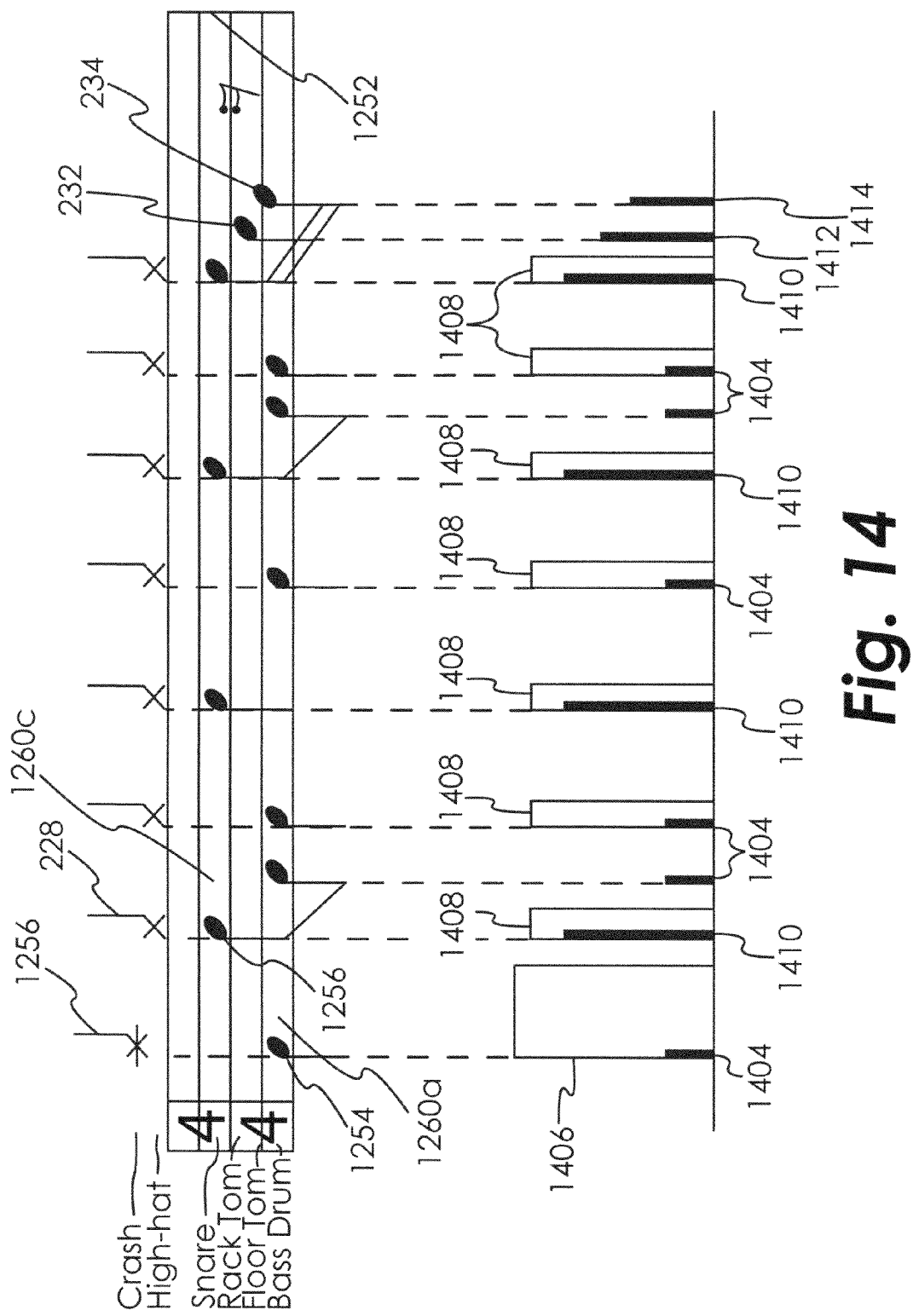
FIG. 14 is a two dimensional view looking perpendicular to the time line of the visual representation of percussive music according to the disclosure associated with standard notation for the same percussive music of FIG. 12.

FIG. 14 shows another embodiment which utilizes a two dimensional view taken perpendicular to the time line 1202. In this view, the previously seen circles, spheroids, rings or toroids turn into bars of various height and thickness. Spheroids 1204 and toroids 1206, 1208, 1210, 1212 and 1214 from FIG. 12 correspond to bars 1404, 1406, 1408, 1410, 1412, and 1414 in FIG. 14. For each instrument, its corresponding bar has a height that relates to the particular space or line in, above, or below the staff on which the musical notation for that instrument is transcribed in standard notation. Additionally, the thickness of the bar for each instrument corresponds with the duration or decay time of the sound played by that instrument. For example, bar 1406 is much wider than bar 1404, demonstrating the difference in duration when a bass drum and a crash cymbal are struck. To enhance the visual effect when multiple instruments are played simultaneously, certain bars may be filled in with color or left open.

The spatial layout of the two dimensional side view shown in FIG. 14 also corresponds to the time at which the instrument is sounded, similar to the manner in which music is displayed in standard notation (to some degree). Thus, the visual representation of rhythm generated by the disclosed system and method can be easily converted to sheet music in standard notation by substituting the various bars (and spaces therebetween) into their corresponding representations in standard notation. For example, bar 1404 (representing the bass drum) will be converted to a note 1254 in the lowest space 1260a of staff 1252. Likewise, bar 1410 (representing the snare drum) will be converted to a note 1256 in the second highest space 1260c of staff 1252.

The 3-D visualization of this Rhythmical Component as shown, for example, in FIG. 12, results in imagery that appears much like a 'wormhole' or tube. For each composition of music, a finite length tube is created by the system which represents all of the rhythmic structures and relationships within the composition. This finite tube may be displayed to the user in its entirety, much like traditional sheet music. For longer compositions, the tube may be presented to the user in sections to accommodate different size video display screens. To enhance the user's understanding of the particular piece of music, the 3-D 'wormhole' image may incorporate real time animation, creating the visual effect of the user traveling through the tube. In one embodiment, the rhythmic structures appear at the point "nearest" to the user as they occur in real time, and travel towards the "farthest" end of the tube, giving the effect of the user traveling backwards through the tube.

The two-dimensional view of FIG. 13 can also be modified to incorporate a perspective of the user looking straight "into" the three-dimensional tube or tunnel, with the graphical objects made to appear "right in front of" the user and then move away and into the tube, eventually shrinking into a distant center perspective point. It shall be understood that animation settings for any of the views in FIGS. 12-14 can be modified by the user in various embodiments, such as reversing the animation direction or the duration of decay for objects which appear and the fade into the background. This method of rhythm visualization may also incorporate the use of color to distinguish the different rhythmic structures within a composition of music, much like the MASTER KEY™ diagrams use color to distinguish between tonal intervals. For example, each instance of the bass drum being sounded can be represented by a sphere of a given color to help the user visually distinguish it when displayed among shapes representing other instruments.

In other embodiments, each spheroid (whether it appears as such or as a circle or line) and each toroid (whether it appears as such or as a ring, line or bar) representing a beat when displayed on the graphical user interface will have an associated small "flag" or access control button. By mouse-clicking on one of these access controls, or by click-dragging a group of controls, a user will be able to highlight and access a chosen beat or series of beats. With a similar attachment to the Master Key™ music visualization software (available from Musical DNA LLC, Indianapolis, Ind.), it will become very easy for a user to link chosen notes and musical chords with certain beats and create entire musical compositions without the need to write music using standard notation. This will allow access to advanced forms of musical composition and musical interaction for many people around the world.

In addition to music education and composition, the above methods can be utilized to visualize and identify infinitely small divisions of measurement in a variety of scientific and artistic applications. Such measurements are commonly required in tight tolerance manufacturing and inspection systems, advanced radio and satellite tuning, nanotechnology, read heads on scanning probe microscopes and virtually any environment where very small divisions of measurement are required.

To display such infinitely small measurements, the Master Key™ concept can be used to convert traditional units of measurement into an intuitive graphical format based on color and shape that are more easily recognized by the human eye when compared with numerical text values. In addition to using standard musical intervals in the circular graphical representations, however, much smaller graduations can be displayed on the tonal circle or helix by slowly shifting the color and placement of the interval lines on the circle or helix depending on the input measurement value. In certain embodiments, the graduations can be based on any definable physical property, including but not limited to frequency, amplitude, velocity, friction, energy, distance, length, volume, mass, force, etc.

Figure 15:
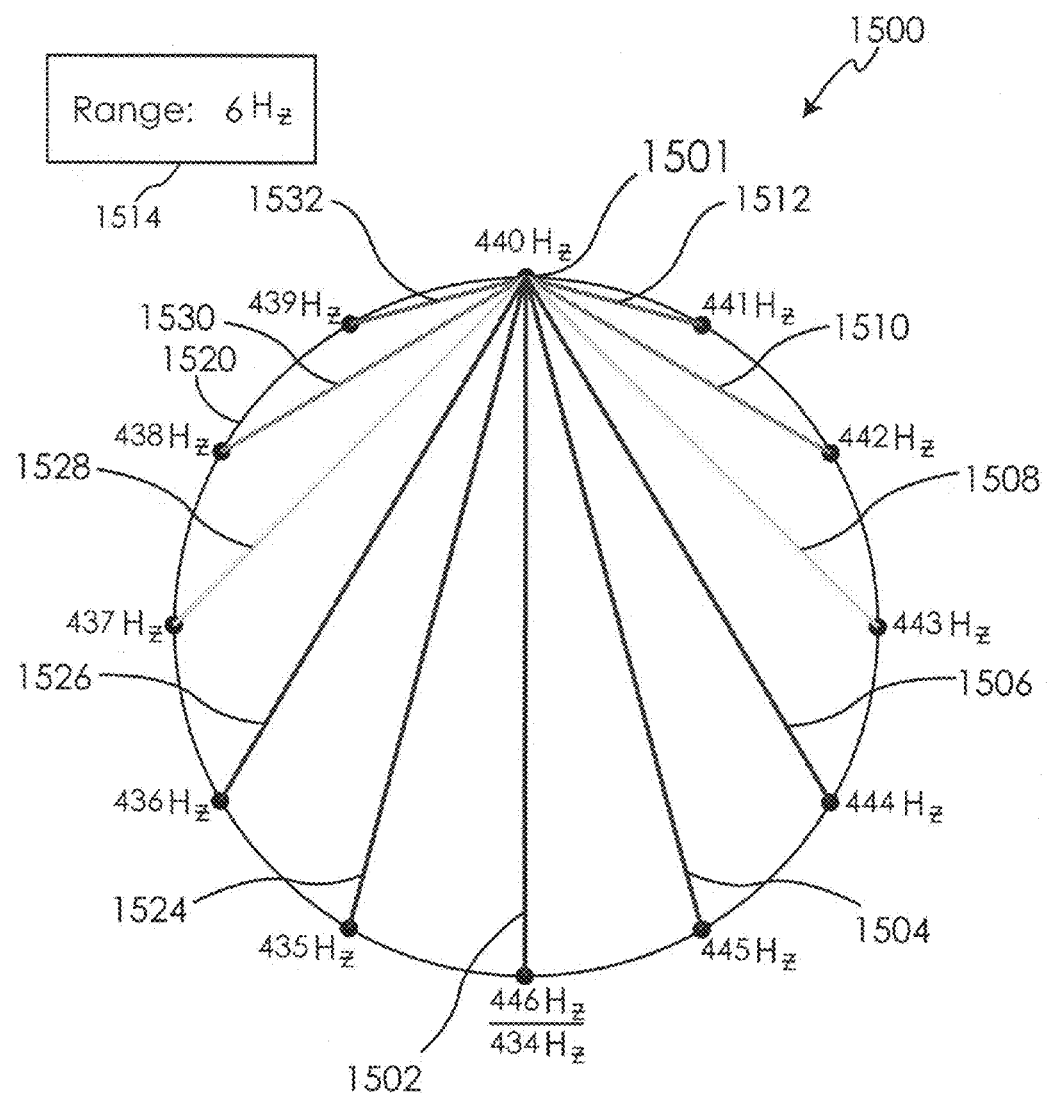
FIG. 15 is a diagram showing six subdivisions of measurement in a single range according to one embodiment.

As shown in FIG. 15, the Master Key™ diagram 1500 has labeled lines corresponding to units of measurement. At perfect unison, or zero level of measurement, there is no line, just white light, represented by the top point 1501. At maximum value for a given base unit of measurement, purple line 1502 is displayed. This line normally corresponds to a tri-tone when used to visualize music compositions, but here it can be assigned to any definable quantity. As the quantity being measured gets smaller (going from a higher relative measurement, down towards a target level), the representative lines shift from purple line 1502, to blue line 1504, green line 1506, yellow line 1508, orange line 1510 and red line 1512. Likewise, as the quantity being measured gets larger (going from a lower relative measurement, up towards a target level), the representative lines shift from purple line 1502, to blue line 1524, green line 1526, yellow line 1528, orange line 1530 and red line 1532. An optional range indicator 1514 may be displayed to indicate what level of preciseness is currently being represented by the display. As shown in FIG. 15, the displayed range is 6 Hz, meaning that the purple color line 1502 represents a difference of 6 Hz from the target frequency. In certain embodiments, the circle 1520 may be hidden in the display, with only the colored lines 1502-1512 and 1524-1532 being visible to the user. In other embodiments, the circle 1520 may be displayed as a visual reference.

A problem arises, however, when the measured quantity falls within the level represented by the red color line. In this case, a new repeating rainbow can be generated in between the top point 1501 of the circle and the red color line 1512 (or between the top point 1501 and the red color line 1532), as shown in FIG. 16A and the enlarged view of FIG. 16B. Once the measurement falls just below the quantity represented by the red color line 1512, the displayed color line will change to purple color line 1602, blue color line 1604, green color line 1606, yellow color line 1608, orange color line 1610, and red color line 1612 as the value approaches zero. If the newly generated repeating rainbows become too small for the user to distinguish on the display, a new circle can be generated to 'magnify' the color changes in a more precise range display. For example, once the measurement reaches a point where it is being visualized by the red color line 1612, the display will reset to display the purple color line 1502 and a range of 1 Hz. In other words, the purple color line 1502 will now represent a deviation of 1 Hz from the target frequency. This process can continue with great increases in resolution until the processing power of the system is maximized. To illustrate, consider the circle 1500 with six levels of subdivision. Each successive rainbow will increase the level of resolution by a factor of six. When the system is magnified to sixteen levels (or sets of rainbows), there are $6^{16}$ or 2,821,109,907,456 subdivisions.

It shall be understood that in addition to a circle, the method and display of FIGS. 15 & 16 may also be used to display measurement quantities on the helix 100 of FIG. 9. This will allow a wider range of measurements to be displayed. For example, if a target frequency is 440 Hz (an "A"), but the measured frequency is 200 Hz (more than an octave lower than the target), a single colored line can be displayed from a point representing 440 Hz to a point representing 200

Hz on the helix. As the measured frequency approaches the target frequency, the color of the displayed line will change according to the scheme described above in relation to FIGS. 15 & 16.

In one embodiment, the display techniques disclosed herein may be used to provide feedback to an operator adjusting an instrument, such as a scanning probe microscope. For example, if it is desired to position the probe at a target position, that target position can be designated to correspond to point 1501 in FIG. 15. The distance between the current probe position and the target position can then be displayed graphically on the circle as one of display lines 1502-1512. As the operator adjusts the target position, the distal endpoint of the display line will move ever closer to the proximal endpoint 1501 and the color of the display line will also change according to the scheme described herein. It shall be understood that in addition to the color scheme described herein, other color schemes may be employed. The number of subdivisions through which the operator must maneuver can be chosen based upon the desired tolerance associated with the target position. Providing such intuitive visual feedback to the operator will greatly simplify the adjustment operation and reduce the time required to reposition the probe to the first position.

In another embodiment, the display technique disclosed herein may be applied to a musical instrument tuning device. For example, if it is desired to tune the instrument to a target frequency, that target frequency can be designated to correspond to point 1501 on FIG. 15. The difference between the output frequency of the instrument and the target frequency can then be displayed graphically on the circle as one of lines 1502-1512. As the operator adjusts the tuning mechanism of the instrument, the distal endpoint of the display line will move ever closer to the proximal endpoint 1501 and the color of the display line will also change according to the scheme described herein. It shall be understood that in addition to the color scheme described herein, other color schemes may be employed. Again, the use of color enhances the operator's ability to perceive tonal changes and reduces the time required to accurately tune the instrument.

Figure 17:
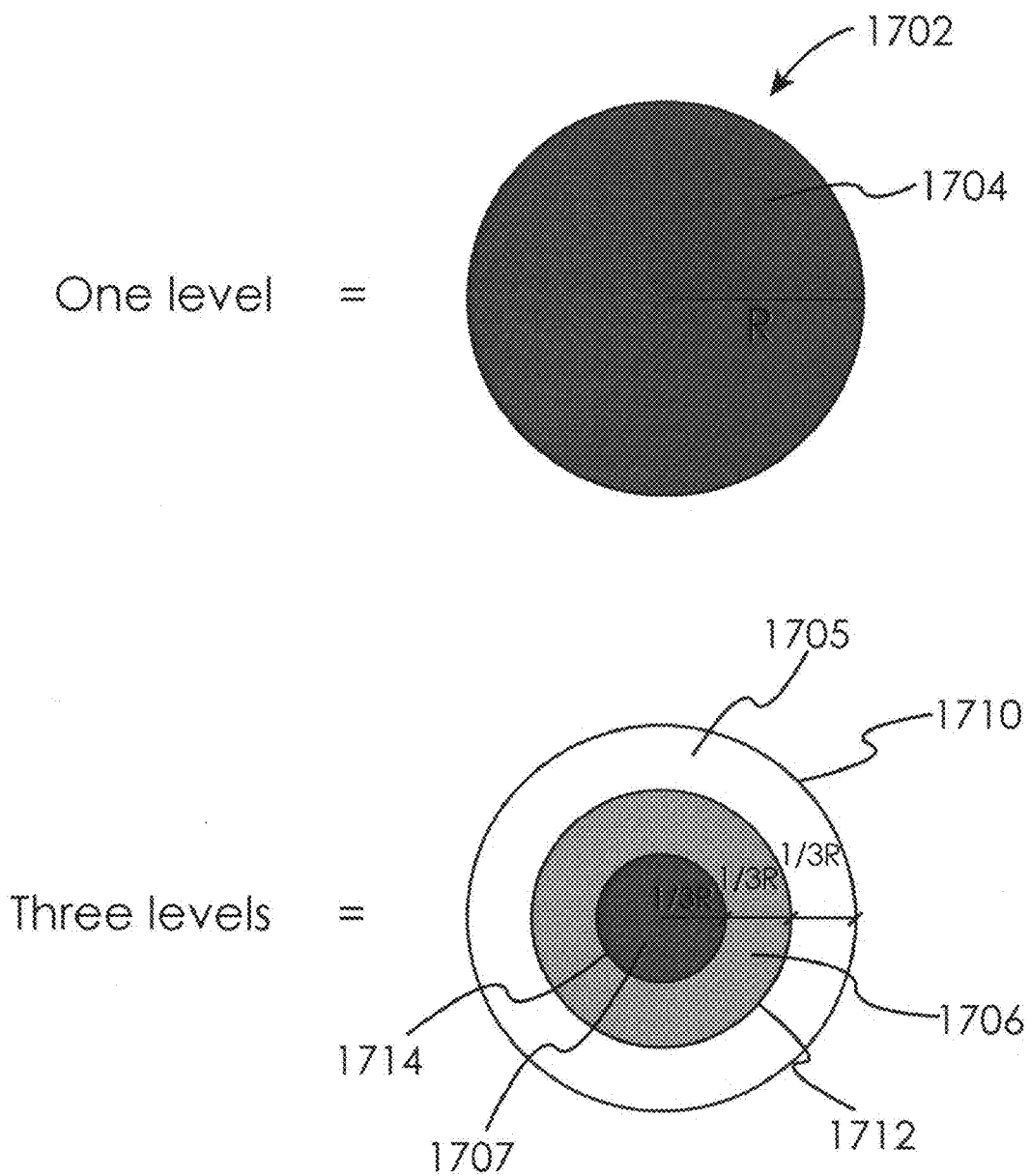
FIG. 17 is a diagram showing one circle with one range of measurement and another circle with three ranges of measurement according to one embodiment.

In other embodiments, a base level of measurement is represented by a circle 1702, as shown in FIG. 17. The user is able to choose how many levels of preciseness are required for display. If one level is needed, the area 1704 within the circle 1702 will change color ranging from purple, to blue, to green, to yellow, to orange, to red, and to white light as the measurement from the target decreases toward zero. If multiple levels of preciseness are required, additional smaller concentric circles will be shown within the larger circle to represent smaller ranges. For example, with three levels of subdivision, circle 1710, circle 1712, and circle 1714 are shown. When the measurement is in the largest range, the area 1705 between circle 1710 and circle 1712 changes color from purple to white as the measurement decreases through that range. After reaching the smallest value of the largest range, the area 1706 between circle 1712 and 1714 begins to change color from purple to white as the measurement value decreases. Once the smallest value of the middle range is reached, the area 1707 within circle 1714 begins to change from purple to white until the smallest subdivision is reached. Once this last unit of measurement is reached, the entire area of the largest circle (and all of the concentric inner circles) will be white.

Figure 18:
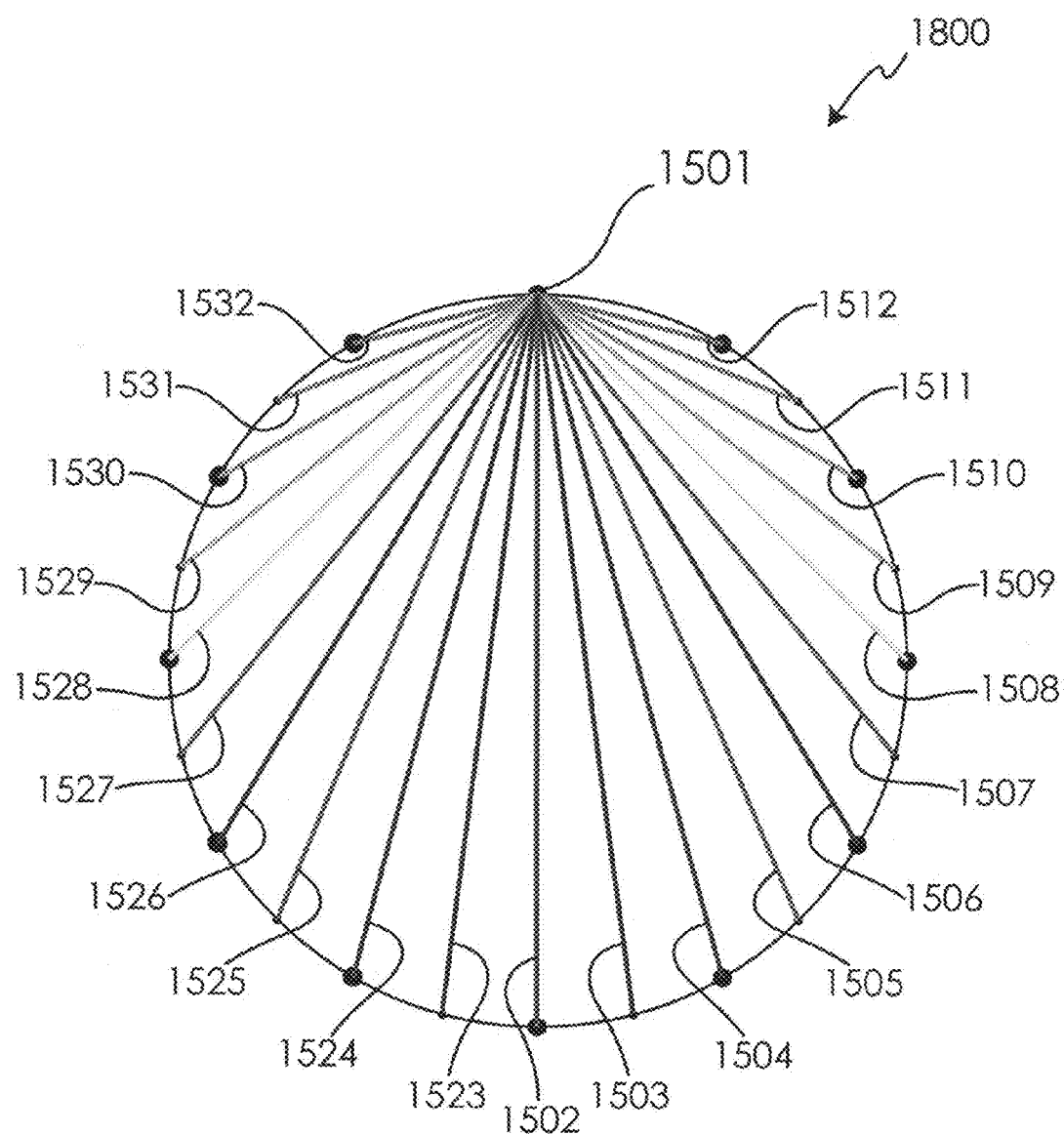
FIG. 18 is a diagram showing a circle with twelve subdivisions of measurement in a single range according to one embodiment.

Because a computer can easily run a program that fills a circle (or 3-dimensional sphere or orb) with a solid color, and shift that circle into levels as is described above, there will be much unused processing power and memory left over. This unused processing power can now be used to further subdivide the amount of color graduations within each level or circle. So instead of just six color graduations, the amount can be increased to twelve, twenty-four, etc., depending on the capabilities of the processor. FIG. 18 shows a circle 1800 with twelve graduations as opposed to six. Again, the maximum value is displayed by the purple line 1502. As the quantity being measured gets smaller (when starting from a quantity greater than the target level 1501), the representative lines shift to purple-blue line 1503, blue line 1504, blue-green line 1505, green line 1506, yellow-green line 1507, yellow line 1508, yellow-orange line 1509, orange line 1510, red-orange line 1511 and red line 1512. Likewise, as the quantity being measured gets larger (when starting from a quantity smaller than the target level 1501), the representative lines shift to purple-blue line 1523, blue line 1524, blue-green line 1525, green line 1526, yellow-green line 1527, yellow line 1528, yellow-orange line 1529, orange line 1530, red-orange line 1531 and red line 1532. In certain embodiments, the displayed line will shift color and position incrementally over the number of available gradations as shown in FIG. 18. In other embodiments, the displayed line will shift color and position in a smooth or gradual fashion as the measurement value changes. In a similar fashion, the solid circles shown in FIG. 17 could also use a larger amount of color increments within each circle, up to the processing capabilities of the system.

Figure 19:
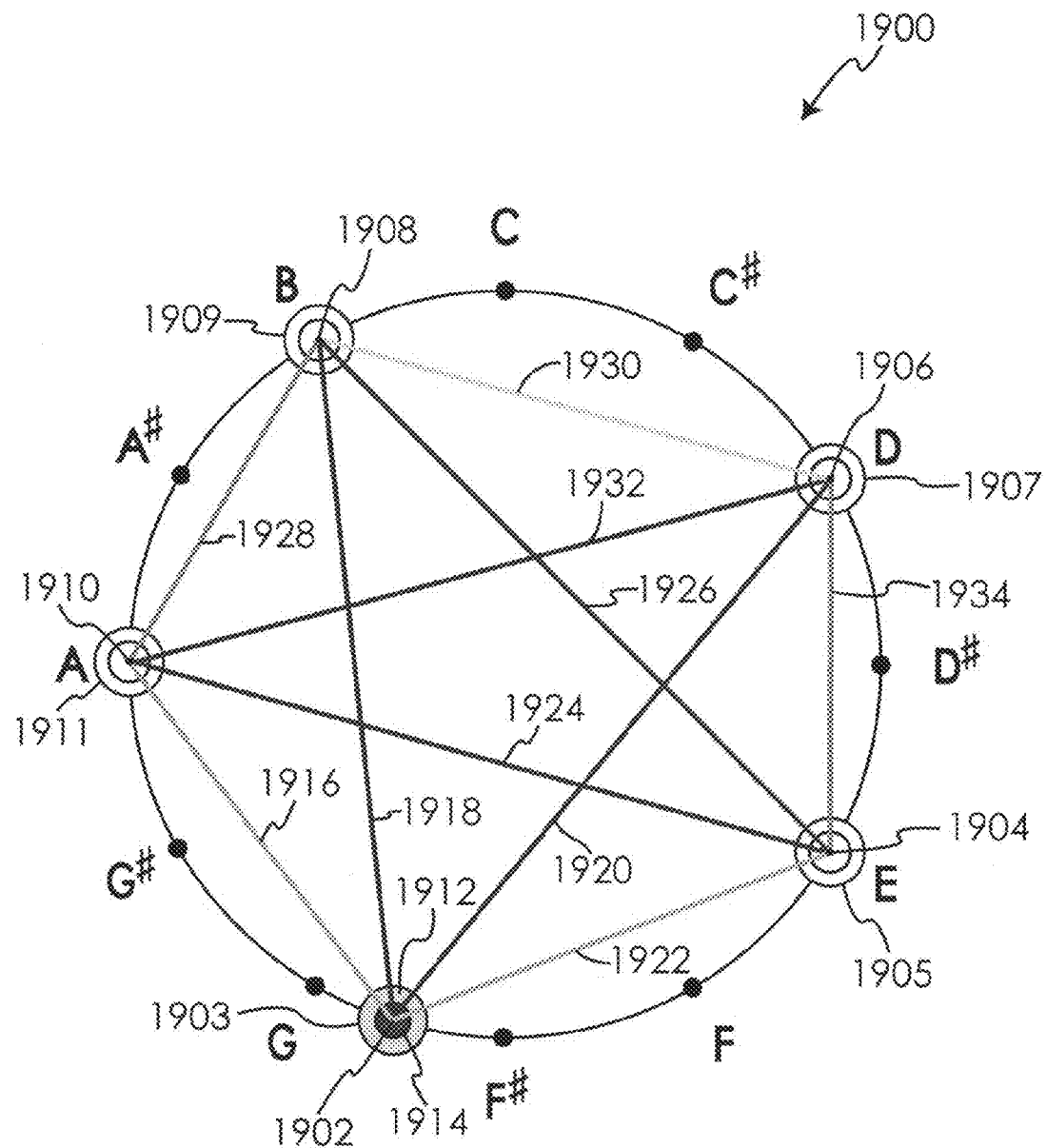
FIG. 19 is a diagram showing a tonal circle while multiple notes are being sensed according to one embodiment.

FIG. 19 shows a hybrid display according to one embodiment of the present disclosure wherein multiple measurements are taken simultaneously and displayed using both the line format of FIG. 15 and the concentric circle format of FIG. 17. As shown in FIG. 19, five measured sounds are being displayed. Such a situation may occur when a user is attempting to simultaneously tune five strings of a musical instrument, such as a guitar as one non-limiting example. For each measured sound, a point is displayed on the circle 1900. As shown in the example of FIG. 19, point 1902 represents a measured sound whose frequency lies somewhere between an "F#" and a "G" note, point 1904 represents a perfect "E" sound, point 1906 represents a perfect "D" sound, point 1908 represents a perfect "B" sound and point 1910 represents a perfect "A" sound.

Colored lines 1916-1934 are displayed between the points using the scheme described hereinabove. The displayed color of each line corresponds to the frequency difference between the two points it connects. Lines 1924, 1926, and 1932 are blue, the color assigned to a perfect fourth. Line 1930 is yellow, the color corresponding to a minor third. Lines 1928 and 1934 are orange, the color corresponding to a major second. Because the sensed sound represented by point 1902 falls somewhere between an "F#" and a "G", lines 1916 and 1922 are a shade of yellow-orange and lines 1918 and 1920 are a shade of blue-green. As the frequency of the sensed sound increases and point 1902 moves closer to the "G" indicator on the circle 1900, line 1916 will gradually turn pure orange, line 1922 will become pure yellow, line 1918 will become pure green and line 1920 will become pure blue.

As the sensed sound changes (such as when the user adjusts the tension on a guitar string), the user may use the changing color of the displayed lines to visually determine when the target frequency has been achieved. When the sensed sound becomes very close to the target, however, it may be difficult for the user to make this determination based on the line color or position of the point on the display alone. The concentric circular display format of FIG. 17 may therefore be provided to help the user visually discern more precise levels of measurement as the sensed sound gets closer to the target frequency.

In the example of FIG. 19, the concentric circular displays 1903, 1905, 1907, 1909 and 1911 represent two levels of precision. Consistent with the position of point 1902 from the target frequency (a "G" in this case), the outer layer 1912 of concentric circular display 1902 is yellow and the inner layer 1914 is purple. The yellow color of layer 1912 indicates that point 1902 is somewhere within the outer adjustment range (the less precise of the two ranges), but outside of the inner adjustment range. The purple color of inner layer 1914 indicates that the inner adjustment range (the more precise of two ranges) is still "maxed out". As the measured frequency increases and point 1902 moves closer to the target "G" frequency, the outer layer 1912 will continue to change from blue to green to yellow to orange to red and finally turn to white. As the measured sound continues to get even closer to the target frequency, the inner layer 1914 will then begin to turn from purple to blue to green to yellow to orange to red and finally to white. When inner layer 1914 becomes white, this indicates to the user that the most precise adjustment of the sound has been achieved (based on the two available levels of measurement being indicated by concentric circular display 1903).

Figure 20:
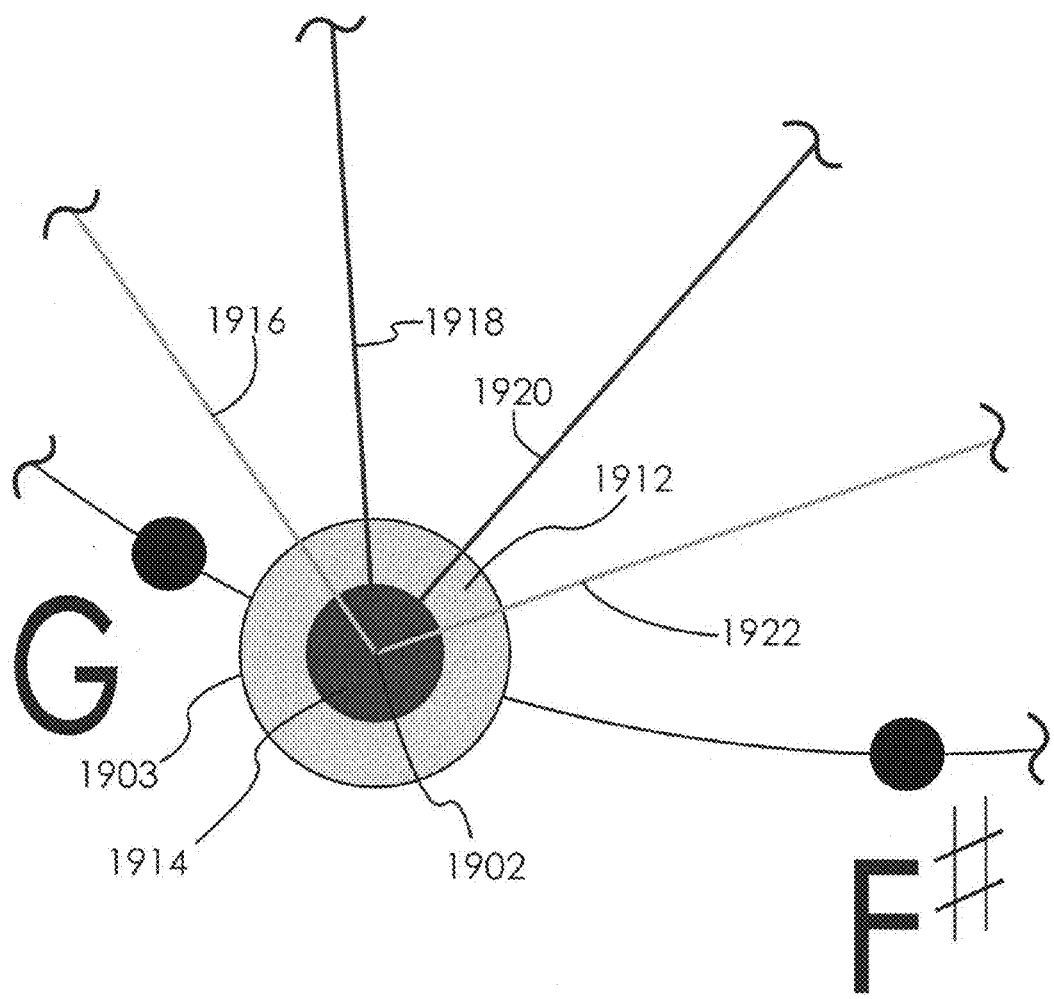
FIG. 20 is a diagram showing an enlargement of a portion of the tonal circle of FIG. 19 while a sensed note is between an "F#" and a "G" according to one embodiment.
Figure 21:
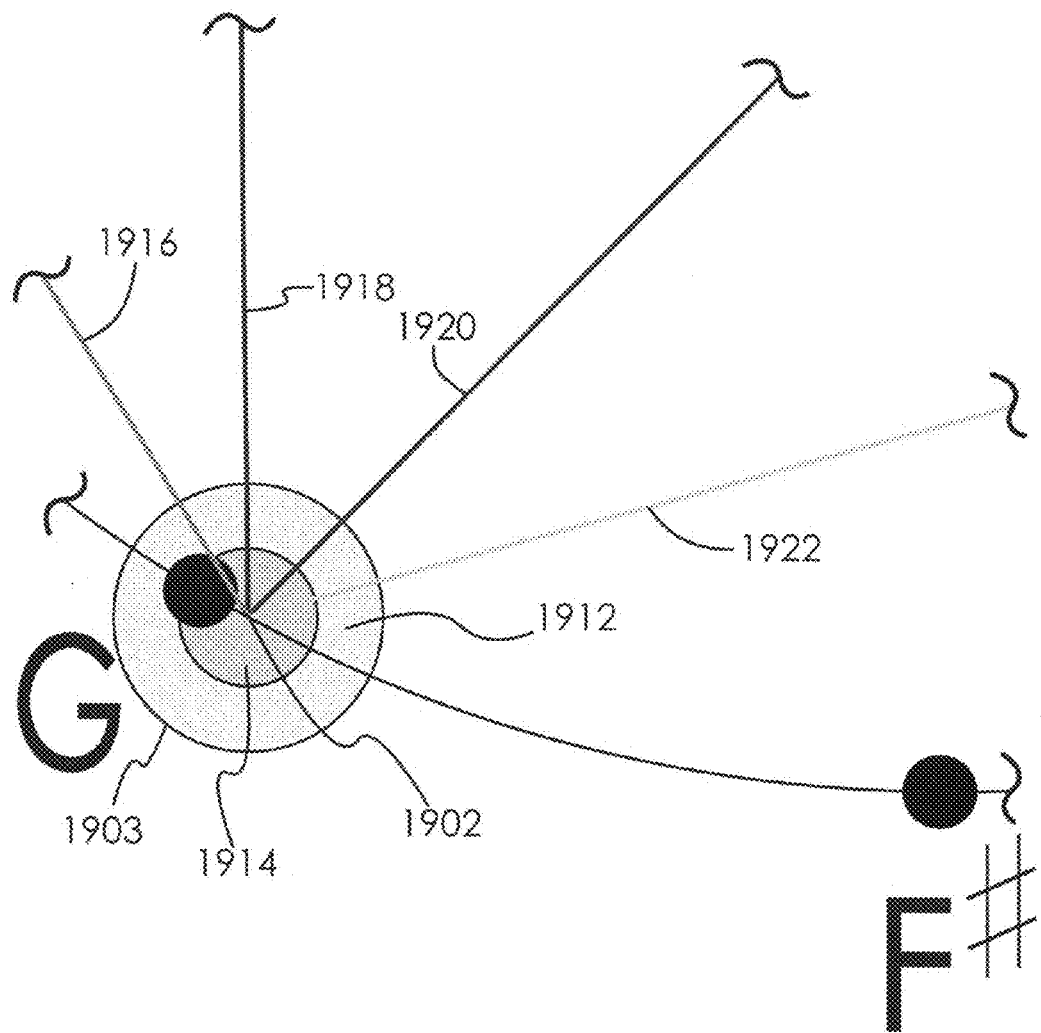
FIG. 21 is a diagram showing the display of FIG. 20 as the sensed note approaches a "G" according to one embodiment.
Figure 22:
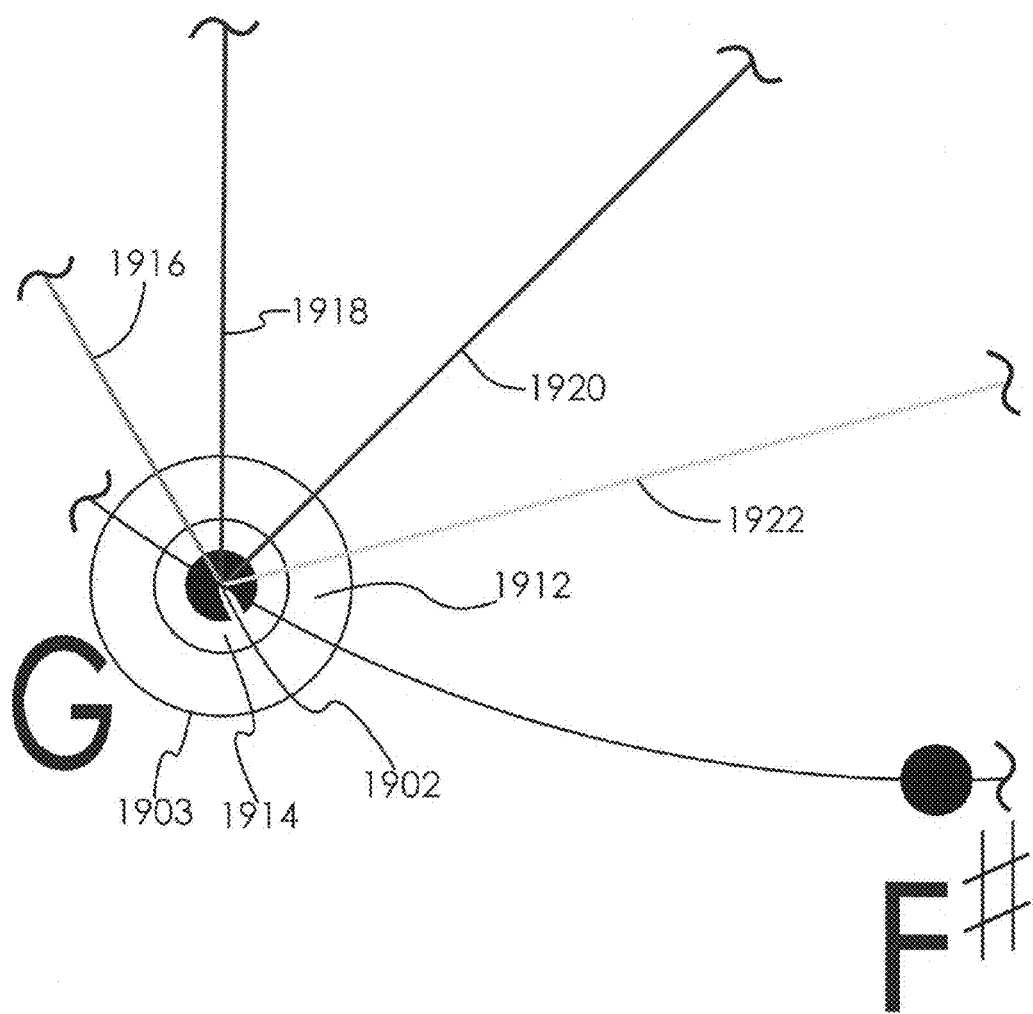
FIG. 22 is a diagram showing the display of FIG. 20 after the sensed note has reached a perfect "G" according to one embodiment.

The above process is further illustrated by FIGS. 20-22. FIG. 20 shows an enlargement of the concentric circular display 1903 from FIG. 19. Again, the frequency of the sensed sound is slightly below a "G". Again, the inner layer 1914 is purple (maxed out) and the outer layer 1912 is yellow, indicating that the measurement is somewhere within the outer adjustment range, but not yet within the inner adjustment range. Lines 1916 and 1922 are again a shade of yellow-orange. Line 1918 is very close to pure green and line 1920 is very close to pure blue, given the proximity of the measured sound to the target "G" frequency.

In FIG. 21, the frequency of the measured sound has been increased and is now even closer to the target frequency ("G" in this case). Outer layer 1914 has become white and inner layer 1912 has become yellow, indicating that the measured sound is now within the most precise adjustment range. Accordingly, line 1916 is now a near-pure orange color, line 1922 is now a near-pure yellow color. Line 1918 remains a near-pure green color and line 1920 remains a near-pure blue color.

In FIG. 22, the frequency of the measured sound has increased further and reached the target frequency. Outer layer 1914 remains white, but inner layer 1912 is now also white, indicating that the most precise level of adjustment has been achieved. Accordingly, line 1916 is pure yellow, line 1922 is pure orange, line 1918 is pure green and line 1920 is pure blue.

In certain embodiments, the concentric circular display 1903 is hidden until the sensed sound is within a defined deviation from the target frequency. Once within the defined deviation, the concentric circular display would "pop" or appear around point 1902. In other words, in certain embodiments, concentric circular display 1903 would not appear in FIG. 20, but would appear in FIGS. 21 and 22.

Figure 23:
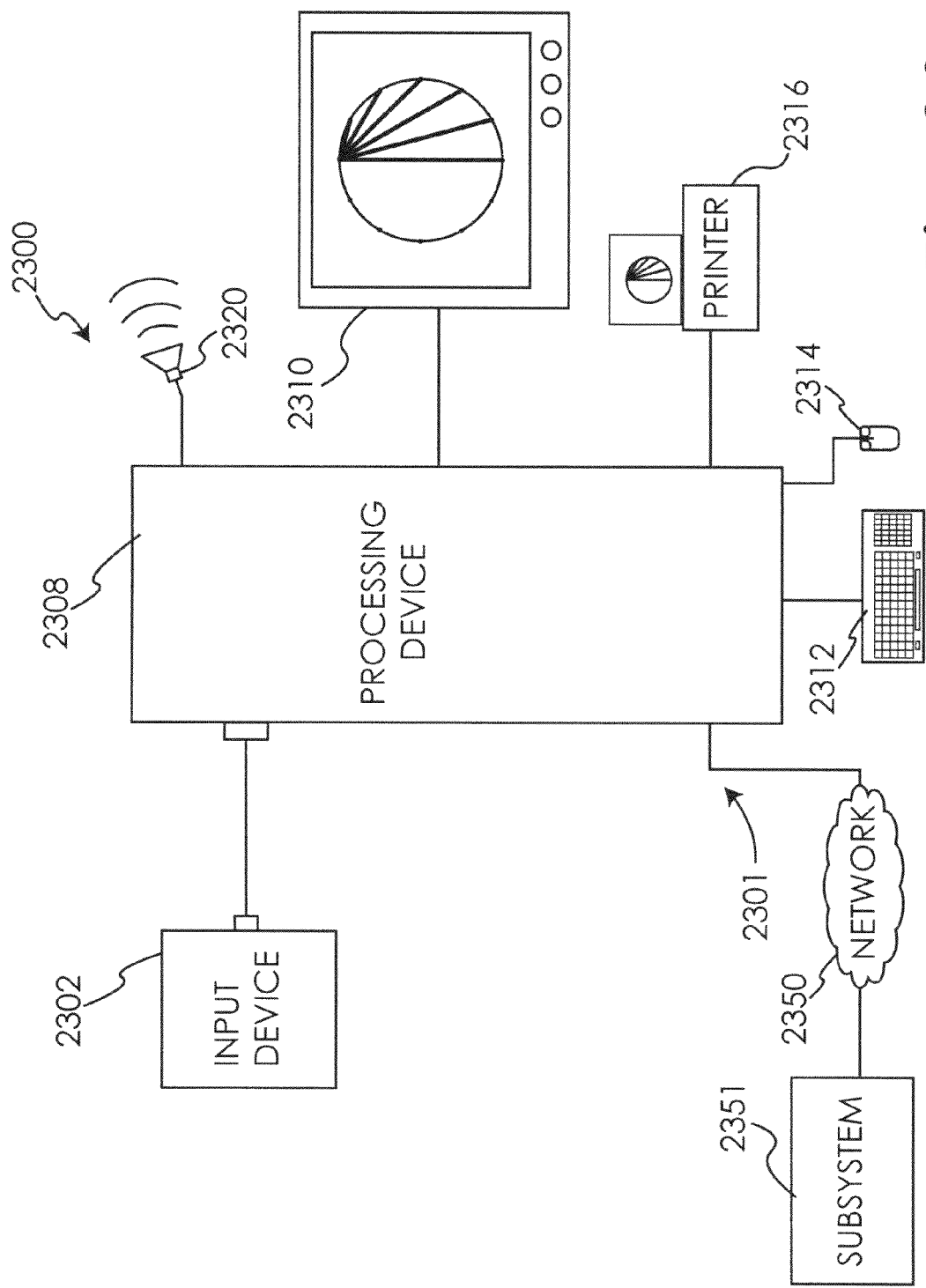
FIG. 23 is a block diagram showing an apparatus for displaying infinitely small divisions of measurement according to one embodiment.

With reference now to FIG. 23, there is shown a processor-based system for providing visual representation of infinitely small divisions of measurement, indicated generally at 2300. The system 1900 may include a first subsystem 2301, including an input device 2302, a display 2310, user input devices such as keyboard 2312 and mouse 2314, a printer device 2316 and one or more speakers 2320. These devices are coupled to allow the input of measurement signals into the processing device so that the signals may be produced by the speaker 2320 and the visual representations of the signals may be displayed, printed or manipulated by users.

The input device 2302 may include an optical sensor, a read head, electromagnetic sensor, microphone, piezoelectric sensor, camera, antenna, or any input device used to detect measurable quantities.

The processing device 2380 may be implemented on a personal computer, a workstation computer, a laptop computer, a palmtop computer, a wireless terminal having computing capabilities (such as a cell phone having a Windows CE or Palm operating system), or the like. It will be apparent to those of ordinary skill in the art that other computer system architectures may also be employed.

In general, such a processing device 2308, when implemented using a computer, comprises a bus for communicating information, a processor coupled with the bus for processing information, a main memory coupled to the bus for storing information and instructions for the processor, and a read-only memory coupled to the bus for storing static information and instructions for the processor. The display 2310 is coupled to the bus for displaying information for a computer user and the input devices 2312, 2314 are coupled to the bus for communicating information and command selections to the processor. A mass storage interface for communicating with a data storage device containing digital information may also be included in processing device 2308 as well as a network interface for communicating with a network.

The processor may be any of a wide variety of general purpose processors or microprocessors such as the PENTIUM microprocessor manufactured by Intel Corporation, a POWER PC manufactured by IBM Corporation, a SPARC processor manufactured by Sun Corporation, or the like. It will be apparent to those of ordinary skill in the art, however, that other varieties of processors may also be used in a particular computer system. Display device 2310 may be a liquid crystal device (LCD), a cathode ray tube (CRT), a plasma monitor, or other suitable display device. The mass storage interface may allow the processor access to the digital information the data storage devices via the bus. The mass storage interface may be a universal serial bus (USB) interface, an integrated drive electronics (IDE) interface, a serial advanced technology attachment (SATA) interface or the like, coupled to the bus for transferring information and instructions. The data storage device may be a conventional hard disk drive, a floppy disk drive, a flash device (such as a jump drive or SD card), an optical drive such as a compact disc (CD) drive, digital versatile disc (DVD) drive, HD DVD drive, BLUE-RAY DVD drive, or another magnetic, solid state, or optical data storage device, along with the associated medium (a floppy disk, a CD-ROM, a DVD, etc.)

In general, the processor retrieves processing instructions and data from the data storage device using the mass storage interface and downloads this information into random access memory for execution. The processor then executes an instruction stream from random access memory or read-only memory. Command selections and information that is input at input devices 2312, 2314 are used to direct the flow of instructions executed by the processor. Equivalent input devices 2314 may also be a pointing device such as a conventional trackball device. The results of this processing execution are then displayed on display device 2310.

The processing device 2380 is configured to generate an output akin to those described in FIGS. 1-22 for display on the display 2310 and/or for driving the printer 2316 to print a hardcopy. Preferably, the video output to display 2310 is also a graphical user interface, allowing the user to interact with the displayed information.

The system 2300 may also include one or more subsystems 2351 substantially similar to subsystem 2301 and communicating with subsystem 2301 via a network 2350, such as a LAN, WAN or the internet. Subsystems 2301 and 2351 may be configured to act as a web server, a client or both and will preferably be browser enabled. Thus with system 2300, remote collaboration may occur between users.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed:

1. A method for displaying a received measurement value, comprising the steps of:
   (a) providing a plurality of labels in a pattern of a circular arc, wherein:
      (1) the plurality of labels corresponds to a plurality of respective measurement values;
      (2) moving clockwise or counter-clockwise on the arc between any one of said labels represents a first measurement increment;
   (b) identifying a target measurement value;
   (c) identifying which one of the plurality of respective measurement values corresponds to the target measurement value;
   (d) identifying an occurrence of a received measurement value;
   (e) identifying which one of the plurality of respective measurement values corresponds to the received measurement value;
   (f) identifying a first label corresponding to the target measurement value;
   (g) identifying a second label corresponding to the received measurement value;
   (h) creating a first line connecting the first label and the second label, wherein:
      (1) the first line is a first color if the target measurement value and the received measurement value are separated by the first measurement increment;
      (2) the first line is a second color if the target measurement value and the received measurement value are separated by a first multiple of the first measurement increment;
      (3) the first line is a third color if the target measurement value and the received measurement value are separated by a second multiple of the first measurement increment;
      (4) the first line is a fourth color if the target measurement value and the received measurement value are separated by a third multiple of the first measurement increment;
      (5) the first line is a fifth color if the target measurement value and the received measurement value are separated by a fourth multiple of the first measurement increment; and
      (6) the first line is a sixth color if the target measurement value and the received measurement value are separated by a sixth multiple of the first measurement increment.

2. The method of claim 1, wherein the plurality of respective measurement values comprise a plurality of musical notes and the occurrence of the received measurement value comprises playing a sound on a musical instrument.

3. The method of claim 1, wherein the first color is red, the second color is orange, the third color is yellow, the fourth color is green, the fifth color is blue and the sixth color is purple.

4. The method of claim 1, wherein:
   the first color has a first frequency that is lower than a second frequency of the second color;
   the second frequency is lower than a third frequency of the third color;
   the third frequency is lower than a fourth frequency of the fourth color;
   the fourth frequency is lower than a fifth frequency of the fifth color; and
   the fifth frequency is lower than a sixth frequency of the sixth color.

5. A method for displaying a received measurement value, comprising the steps of:
   (a) providing a plurality of labels in a pattern of a first circle, wherein:
      (1) the plurality of labels corresponds to a plurality of respective measurement values;
      (2) moving clockwise or counter-clockwise on the first circle between any one of said labels represents a first measurement increment;
   (b) identifying a target measurement value;
   (c) identifying which one of the plurality of respective measurement values corresponds to the target measurement value;
   (d) identifying an occurrence of a received measurement value;
   (e) identifying which one of the plurality of respective measurement values corresponds to the received measurement value;
   (f) identifying a first label corresponding to the target measurement value;
   (g) identifying a second label corresponding to the received measurement value;
   (h) creating a first line connecting the first label and the second label, wherein:
      (1) the first line is a first color if the target measurement value and the received measurement value are separated by the first measurement increment;
      (2) the first line is a second color if the target measurement value and the received measurement value are separated by substantially a first multiple of the first measurement increment;
      (3) the first line is a third color if the target measurement value and the received measurement value are separated by substantially a second multiple of the first measurement increment;
      (4) the first line is a fourth color if the target measurement value and the received measurement value are separated by substantially a third multiple of the first measurement increment;
      (5) the first line is a fifth color if the target measurement value and the received measurement value are separated by substantially a fourth multiple of the first measurement increment; and
      (6) the first line is a sixth color if the target measurement value and the received measurement value are separated by substantially a sixth multiple of the first measurement increment.

6. The method of claim 5, further comprising the steps of:
(i) providing a second circle around the second label, said second circle having a diameter substantially smaller than the diameter of said first circle, wherein:
(1) the area within the second circle is the first color if the target measurement and the received measurement are separated by a second increment, said second increment being smaller than said first increment;
(2) the area within the second circle is the second color if the target measurement and the received measurement are separated by a first multiple of the second increment;
(3) the area within the second circle is the third color if the target measurement and the received measurement are separated by a second multiple of the second increment;
(4) the area within the second circle is the fourth color if the target measurement and the received measurement are separated by a third multiple of the second increment;
(5) the area within the second circle is the fifth color if the target measurement and the received measurement are separated by a fourth multiple of the second increment; and
(6) the area within the second circle is the sixth color if the target measurement and the received measurement are separated by a fifth multiple of the second increment.

7. The method of claim 6, wherein the first color is red, the second color is orange, the third color is yellow, the fourth color is green, the fifth color is blue and the sixth color is purple.

8. The method of claim 6, wherein:
the first color has a first frequency that is lower than a second frequency of the second color;
the second frequency is lower than a third frequency of the third color;
the third frequency is lower than a fourth frequency of the fourth color;
the fourth frequency is lower than a fifth frequency of the fifth color; and
the fifth frequency is lower than a sixth frequency of the sixth color.

9. A method for displaying a received measurement value, comprising the steps of:

(a) providing a plurality of labels in a pattern of a helix, wherein:
(1) each turn of the helix has a plurality of labels corresponding to a plurality of respective measurement values in a respective plurality of measurement ranges;
(2) moving clockwise or counter-clockwise on the helix between any one of said labels represents a first measurement increment;
(b) identifying a target measurement value;
(c) identifying which one of the plurality of respective measurement values and which one of the plurality of respective measurement ranges corresponds to the target measurement value;
(d) identifying an occurrence of a received measurement value;
(e) identifying which one of the plurality of respective measurement values and which one of the respective plurality of measurement ranges corresponds to the received measurement value;
(f) identifying a first label corresponding to the target measurement value;
(g) identifying a second label corresponding to the received measurement value;
(h) creating a first line connecting the first label and the second label, wherein:
(1) the first line is a first color if the target measurement value and the received measurement value are separated by the first measurement increment;
(2) the first line is a second color if the target measurement value and the received measurement value are separated by substantially a first multiple of the first measurement increment;
(3) the first line is a third color if the target measurement value and the received measurement value are separated by substantially a second multiple of the first measurement increment;
(4) the first line is a fourth color if the target measurement value and the received measurement value are separated by substantially a third multiple of the first measurement increment;
(5) the first line is a fifth color if the target measurement value and the received measurement value are separated by substantially a fourth multiple of the first measurement increment; and
(6) the first line is a sixth color if the target measurement value and the received measurement value are separated by substantially a sixth multiple of the first measurement increment.

* * * * *